(12) United States Patent
Nakamura et al.

(10) Patent No.: US 7,203,787 B2
(45) Date of Patent: Apr. 10, 2007

(54) INFORMATION PROCESSING APPARATUS AND METHOD THAT UTILIZES STORED INFORMATION ABOUT A MOUNTABLE DEVICE

(75) Inventors: Atsushi Nakamura, Kawasaki (JP); Koji Fukunaga, Tokyo (JP); Makoto Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 11/232,996

(22) Filed: Sep. 23, 2005

(65) Prior Publication Data

US 2006/0020729 A1  Jan. 26, 2006

Related U.S. Application Data

(63) Continuation of application No. 09/490,448, filed on Jan. 24, 2000, now abandoned.

(30) Foreign Application Priority Data

Jan. 25, 1999 (JP) ................................. 11-016331
Jul. 6, 1999 (JP) ................................. 11-192300

(51) Int. Cl.
*G06F 13/36* (2006.01)
(52) U.S. Cl. .................... 710/306; 710/305; 710/100
(58) Field of Classification Search ........ 710/305–306, 710/100; 365/52
See application file for complete search history.

(56) References Cited

U.S. PATENT DOCUMENTS

| | | | |
|---|---|---|---|
| 4,591,973 A | 5/1986 | Ferris, III et al. .............. 710/3 |
| 5,170,471 A | 12/1992 | Bonevento et al. ........... 710/17 |
| 5,383,147 A | 1/1995 | Sanemitsu .................... 365/52 |
| 5,922,056 A | 7/1999 | Amell et al. .................. 710/16 |
| 5,991,542 A | 11/1999 | Han et al. .................... 717/167 |
| 6,176,422 B1 | 1/2001 | Hattori ........................ 235/375 |
| 6,209,023 B1 | 3/2001 | Dimitroff et al. ........... 709/211 |
| 6,249,835 B1 | 6/2001 | Isoda .......................... 710/201 |
| 6,269,292 B1 | 7/2001 | Kokubu et al. ............... 701/35 |
| 6,336,152 B1 | 1/2002 | Richman et al. ............... 710/8 |
| 6,369,905 B1 | 4/2002 | Mitsuhashi et al. ........ 358/1.14 |
| 6,370,603 B1 | 4/2002 | Silverman et al. ............ 710/72 |
| 6,721,818 B1 | 4/2004 | Nakamura ..................... 710/9 |
| 2002/0023189 A1 | 2/2002 | Fensore et al. ............. 710/305 |

FOREIGN PATENT DOCUMENTS

| | | |
|---|---|---|
| JP | 06-004234 | 1/1994 |
| JP | 9-282263 | 10/1997 |
| JP | 10-173689 | 6/1998 |
| JP | 2001-503930 | 3/2001 |
| WO | WO 97/49057 | 12/1997 |

*Primary Examiner*—Rehana Perveen
*Assistant Examiner*—Kim T. Huynh
(74) *Attorney, Agent, or Firm*—Fitzpatrick, Cella, Harper & Scinto

(57) ABSTRACT

An IEEE 1394-compliant communication bus connects a printer and host computer so as to allow communication. The configuration ROM of the printer stores information about devices mountable on the apparatus. The host computer accesses the configuration ROM via the communication bus to acquire information in a Feature Directory. The Feature Directory stores information about optional devices connectable to the printer. Information about the printer is displayed based upon information acquired from the Feature Directory. This allows the user to easily grasp information about devices mountable on the apparatus.

21 Claims, 42 Drawing Sheets

CABLE CROSS SECTION

EXCLUSIVE-OR SIGNAL BETWEEN Data AND Strobe

BRANCH : NODE TO WHICH TWO OR MORE NODES ARE CONNECTED

LEAF : NODE HAVING ONLY ONE PORT CONNECTED

□ : PORT
c : PORT THAT CORRESPONDS TO NODE OF CHILD
p : PORT THAT CORRESPONDS TO NODE OF PARENT

FIG. 10
CSR CORE REGISTER

| OFFSET (HEXADECIMAL) | REGISTER NAME | FUNCTION |
|---|---|---|
| 000 | STATE_CLEAR | INFORMATION ABOUT STATUS AND CONTROL |
| 004 | STATE_SET | INFORMATION INDICATIVE OF WHETHER STATE_CLEAR CAN BE WRITTEN |
| 008 | NODE_IDS | BUS ID + NODE ID |
| 00C | RESET_START | RESET BUS BY WRITE IN THIS AREA |
| 010~014 | INDIRECT_ADDRESS, INDIRECT_DATA | REGISTER FOR ACCESS ROM LARGER THAN 1K |
| 018~01C | SPLIT_TIMEOUT | VALUE OF TIMER FOR DETECTING TIME-OUT OF SPLIT TRANSACTION |
| 020~02C | ARGUMENT, TEST_START, TEST_STATUS | DIAGNOSTIC REGISTER |
| 030~04C | UNITS_BASE, UNITS_BOUND, MEMORY_BASE, MEMORY_BOUND | UNUSED IN IEEE1394 |
| 050~054 | INTERRUPT_TARGET, INTERRUPT_MASK | INTERRUPT NOTIFYING REGISTER |
| 058~07C | CLOCK_VALUE, CLOCK_TICK_PERIOD, CLOCK_STROBE_ARRIVED, CLOCK_INFO | UNUSED IN IEEE1394 |
| 080~0FC | MESSAGE_REQUEST, MESSAGE_RESPONSE | MESSAGE NOTIFYING REGISTER |
| 100~17C | | RESERVED |
| 180~1FC | ERROR_LOG_BUFFER | RESERVED FOR IEEE1394 |

FIG. 11
SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR SYNCHRONIZING TIME |
| 208 | POWER_FAIL_IMMINENT | REGISTER CONCERNING POWER SUPPLY |
| 20C | POWER_SOURCE | |
| 210 | BUSY_TIMEOUT | CONTROL RETRY OF TRANSACTION LAYER |
| 214~218 | | RESERVED |
| 21C | BUS_MANAGER_ID | NODE ID OF BUS MANAGER |
| 220 | BANDWIDTH_AVAILABLE | MANAGE ISOCHRONOUS TRANSFER BANDWIDTH |
| 224~228 | CHANNELS_AVAILABLE | MANAGE ISOCHRONOUS TRANSFER CHANNEL NUMBER |
| 22C | MAINT_CONTROL | DIAGNOSTIC REGISTER |
| 230 | MAINT_UTILITY | |
| 234~3FC | | RESERVED |

FIG. 12

SERIAL BUS DEVICE REGISTER

| OFFSET (HEXADECIMAL) | REGISTER NAME | FUNCTION |
|---|---|---|
| 800~FFC | | RESERVED |
| 1000~13FC | TOPOLOGY_MAP | INFORMATION ABOUT CONFIGURATION OF SERIAL BUS |
| 1400~1FFC | | RESERVED |
| 2000~2FFC | SPEED_MAP | INFORMATION ABOUT TRANSFER SPEED OF SERIAL BUS |
| 3000~FFFC | | RESERVED |

FIG. 13

CONFIGURATION ROM OF MINIMUM FORMAT

| 01 | VENDOR ID |
|---|---|

REQUESTS FOR BUS ACCESS

BUS ACCESS GRANTED

PACKET OF ISOCHRONOUS DATA

FIG. 26

| ABBREVIATION | NAME | CONTENT |
|---|---|---|
| destination_ID | destination identifier | REPRESENT ID OF DESTINATION NODE (FOR ONLY ASYNCHRONOUS TRANSFER) |
| tℓ | transaction label | LABEL FOR REPRESENTING SERIES OF TRANSACTIONS (FOR ONLY ASYNCHRONOUS TRANSFER) |
| rt | retry code | CODE INDICATIVE OF RETRY STATUS (FOR ONLY ASYNCHRONOUS TRANSFER) |
| tcode | transaction code | CODE INDICATIVE OF TYPE OF PACKET (FOR ONLY ASYNCHRONOUS TRANSFER) |
| pri | priority | PRIORITY (FOR ONLY ASYNCHRONOUS TRANSFER) |
| source_ID | source identifier | TRANSMISSION SOURCE NODE (FOR ONLY ASYNCHRONOUS TRANSFER) |
| destination_offset | destination memory address | MEMORY ADDRESS OF DESTINATION NODE (FOR ONLY ASYNCHRONOUS TRANSFER) |
| rcode | response code | RESPONSE STATUS (FOR ONLY ASYNCHRONOUS TRANSFER) |
| quadlet_data | quadlet (4bytes) data | 4-BYTE DATA (FOR ONLY ASYNCHRONOUS TRANSFER) |
| data_length | length of data | LENGTH OF data_field (EXCEPT FOR pad bytes) |
| extended_tcode | extended transaction code | EXTENDED TRANSACTION CODE (FOR ONLY ASYNCHRONOUS TRANSFER) |
| chanel | isochronous identifier | IDENTIFY ISOCHRONOUS PACKET |
| sy | synchronization code | USED TO SYNCHRONIZE VIDEO DATA, AUDIO DATA, AND THE LIKE (FOR ONLY ASYNCHRONOUS TRANSFER) |
| cycle_time_data | contents of the CYCLE_TIME register | VALUE OF CYCLE TIMER REGISTER OF CYCLE MASTER NODE (FOR ONLY CYCLE PACKET ) |
| data_field | data + pad bytes | DATA IS STORED (FOR ISOCHRONOUS AND ASYNCHRONOUS TRANSFER) |
| header_CRC | CRC for header field | CRC CORRESPONDING TO HEADER |
| data_CRC | CRC for data field | CRC CORRESPONDING TO DATA |
| tag | tag label | FORMAT OF ISOCHRONOUS PACKET |

FIG. 38A

| INPUT | IMAGE PROCESSING | SPEED | QUALITY |
|---|---|---|---|
| DIGITAL CAMERA | ○ | 6.0 | XGA |
| SCANNER | × | 0.5 | 2400dpi |
| DIGITAL VIDEO (*) | × | 10.0 | VGA |
| DIGITAL TV (*) | × | × | VGA |
| MULTI FUNCTION (*) | ○ | 2.0 | 1200dpi |

FIG. 38B

| OUTPUT | IMAGE PROCESSING | SPEED | QUALITY |
|---|---|---|---|
| PRINTER 1 | ○ | 1.5 | 720dpi |
| PRINTER 2 | ○ | 1.5 | 720dpi |
| PRINTER 3 | × | 1.0 | 360dpi |
| DIGITAL VIDEO (*) | × | 10.0 | VGA |
| DIGITAL TV (*) | × | × | VGA |
| MULTI FUNCTION (*) | ○ | 2.0 | 1200dpi |

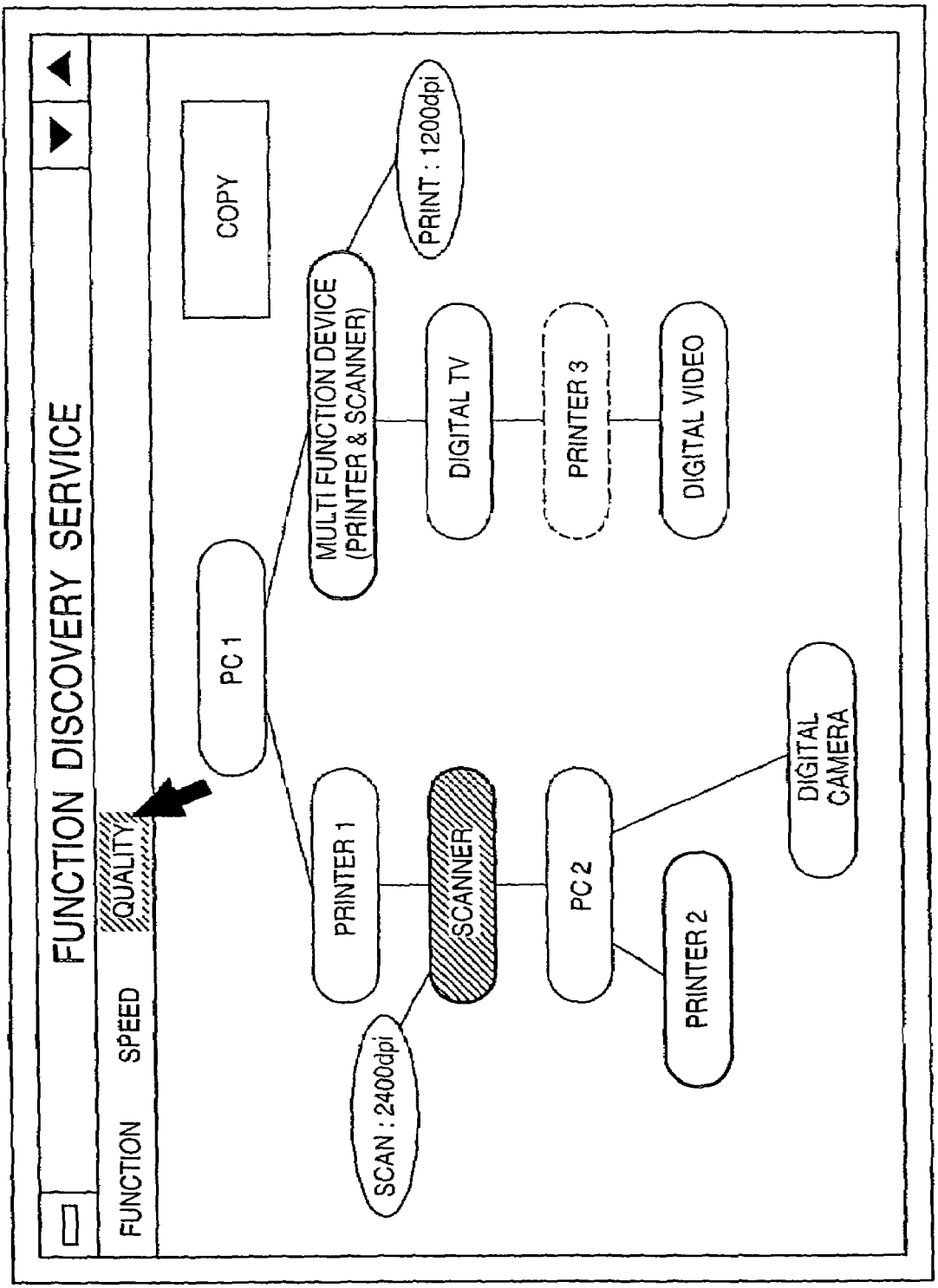

INFORMATION PROCESSING APPARATUS AND METHOD THAT UTILIZES STORED INFORMATION ABOUT A MOUNTABLE DEVICE

This application is a continuation of application Ser. No. 09/490,448 filed Jan. 24, 2000 now abandoned.

BACKGROUND OF THE INVENTION

1. Field of the Invention

The present invention relates to an information processing system constituted by a plurality of information processing apparatuses connected by an interface such as an IEEE 1394 interface, an information processing apparatus connected to the system, and a method therefor.

2. Description of the Related Art

An interface such as an IEEE 1394 interface can simultaneously connect a plurality of devices such as a DV (Digital Video), DC (Digital Camera), host computer, scanner, and VTR, unlike an interface such as a centronics for one-to-one connection between a host and device, and realize a data communication network and the like by connecting a plurality of devices.

As for the IEEE 1394 interface, each node has a node unique ID to allow identifying each device. This ID is made up of 64 bits, upper 24 bits of which represent the manufacturer ID of a device assigned by the IEEE standard, and lower 40 bits of which can be freely set by the manufacturer. The node unique ID determines a specific ID for one device regardless of the manufacturer and model.

This node unique ID allows specifying a device in data communication in an IEEE 1394 network connected to a plurality of devices.

Display means and the like have been available which represent a plurality of devices in a network using such information and display device information in the network to manage the use of the network and improve the convenience.

Various devices are connected to this network, and many unspecified devices of different manufacturers can be connected. Some devices connected to a communication control bus allow additionally mounting/dismounting an optional device in order to improve the basic performance, expand the function, or change the device arrangement. Some devices can change the device arrangement by the modular structure. When the display means for presenting device information is adopted in an environment where many unspecified devices of different manufacturers are connected, device information such as the manufacturer name and model name of the device main body can be determined from the node unique ID and the like. However, it is difficult to grasp information about optional devices mountable on the device and information about actually connected optional devices.

Also, when the device is not connected to a network (one-to-one connection between the host and device), it is difficult for the user to grasp information about optional devices mountable on the device.

When the display means is adopted, it is hard to make a device displayed on the display match an actually connected device. That is, device information such as the manufacturer name and model name can be displayed by the node unique ID, but the user must specify the device from the manufacturer name and model name. It is therefore difficult to specify devices when a plurality of devices of the same manufacturer and the same model are connected. In some cases, it is hard for the user to determine the kind of device, e.g., whether the device is a printer or digital camera from only the manufacturer name and model name.

In the environment where a plurality of devices are connected, the user can know function information of each device as the device ID, but cannot know the function of a device which has an ID whose function is not known in advance. Further, the user can know only the individual function of each device based upon its ID, so cannot know a new function realized by combining a plurality of devices (e.g., the function of a copying machine by combining a scanner and printer).

Even when the relative connection relationship between devices in the network is displayed, the user must specify them while confirming the physical connection of the IEEE 1394 network with respect to the display contents.

This becomes more difficult when the network is wide and a target device is connected out of the user's sight.

SUMMARY OF THE INVENTION

The present invention has been made to overcome the conventional drawbacks, and has as its object to notify the user of information about devices mountable on an apparatus.

It is another object of the present invention to allow the user to easily specify a device which satisfies a desired function in an environment where a plurality of devices are connected.

It is still another object of the present invention to present, to the user, new function information realized by a combination of a plurality of devices and facilitate effective use of the system in an environment where a plurality of devices are connected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a table illustrating the CSR architecture function of the 1394 serial bus;

FIG. 11 is a table illustrating a register concerning the 1394 serial bus;

FIG. 12 is a table illustrating a register concerning the node resource of the 1394 serial bus;

FIG. 13 is a diagram illustrating the minimum format of a configuration ROM of the 1394 serial bus;

FIG. 26 is a table illustrating the detailed fields of the packet format for isochronous transfer in the 1394 serial bus;

FIGS. 38A and 38B are tables each illustrating a function table according to the second embodiment;

FIG. 44 is a view illustrating a state in which the quality is selected on the display of the device map according to the second embodiment.

DETAILED DESCRIPTION OF THE PREFERRED EMBODIMENTS

Preferred embodiments of the present invention will now be described in detail in accordance with the accompanying drawings. An IEEE 1394 serial bus adopted in this embodiment will be explained.

<Overview of IEEE-1394>

The appearance of digital VTRs and DVDs (Digital Video Disks) for home use has been accompanied by the need of transferring a large information quantity of video and audio data (to be referred to as "AV data" hereinafter) in real time. An interface having high-speed data transferability is required to transfer AV data in real time to a personal computer (PC) or transfer AV data to another digital device. An interface that has been developed in view of the foregoing is an IEEE 1394 serial bus (to be simply referred to as a "1394 serial bus").

Figure 1:
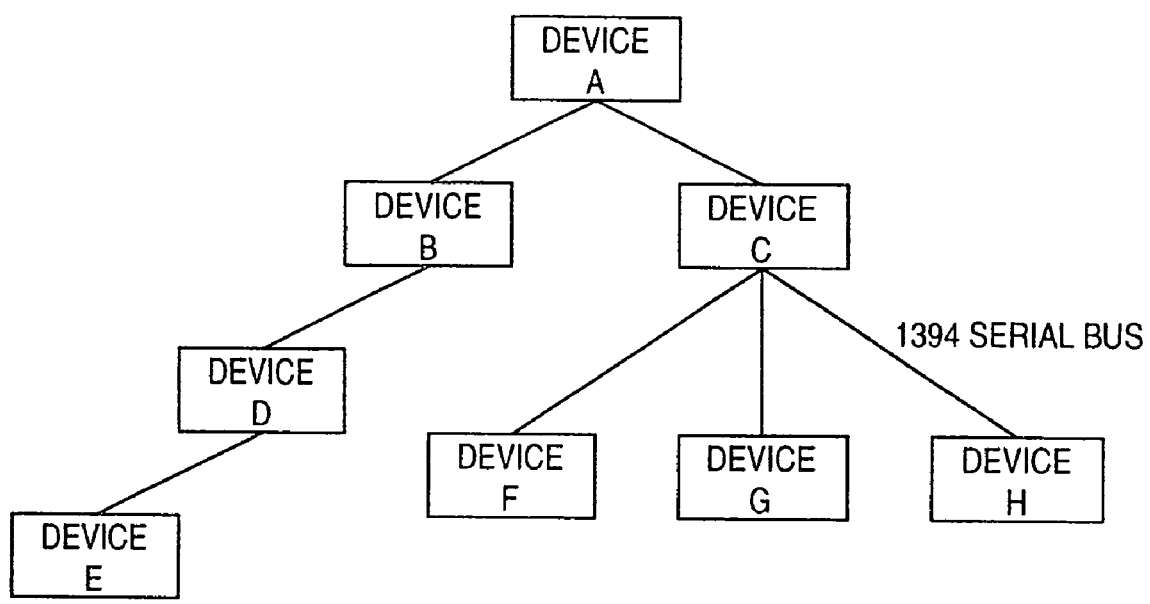
FIG. 1 is a block diagram illustrating a networking system using a 1394 serial bus.

FIG. 1 illustrates an example of a networking system constructed using the 1394 serial bus. This system has devices A to H. Twisted-pair cables of the 1394 serial bus connect devices A and B; A and C; B and D; D and E; C and F; C and G; and C and H. Examples of the devices A to H are a host computer apparatus such as a personal computer, and a computer peripheral device. The computer peripheral device includes a digital VCR, DVD player, digital still camera, storage device such as a hard disk or optical disk using a medium, monitor such as a CRT or LCD, tuner, image scanner, film scanner, printer, MODEM, and terminal adapter (TA). The printing method can be freely selected from an electrophotography method using a laser beam and LED, ink-jet method, ink-fusion or sublimation type thermal transfer method, thermal recording method, and the like.

These devices can be connected by a mixture of a daisy chaining and node branching. A high degree of freedom in making the connections is possible. Each device has an ID and by recognizing their IDs with each other, the devices construct one network over an area connected by the 1394 serial bus. For example, by connecting devices by one 1394 serial bus cable simply in a daisy chain, each device functions as a relay, and the devices in their entirety construct one network.

The 1394 serial bus has a function of automatically recognizing a device and recognizing the connection status by only connecting the device to the 1394 serial bus cable. In the system shown in FIG. 1, devices can be disconnected from or added to the network. At this time, the bus is automatically reset (information about the previous network configuration is reset), and then a new network is constructed afresh. This function makes it possible to set up a network at any time and for the network to identify the devices constructing it.

Further, the data transfer speed of the 1394 serial bus is defined to 100, 200 and 400 Mbps. Devices having higher transfer speeds support lower transfer speeds and are compatible with the devices of lower speed. The data transfer modes available are an asynchronous transfer mode for transferring asynchronous data such as control signals, and an isochronous transfer mode for transferring isochronous data such as real-time AV data. In each cycle (usually 125 µs/cycle), the asynchronous data and isochronous data are mixed and transferred in one cycle, while priority is given to transfer of the isochronous data, following transfer of a cycle-start packet (CSP) that indicates the start of the cycle.

Figure 2:
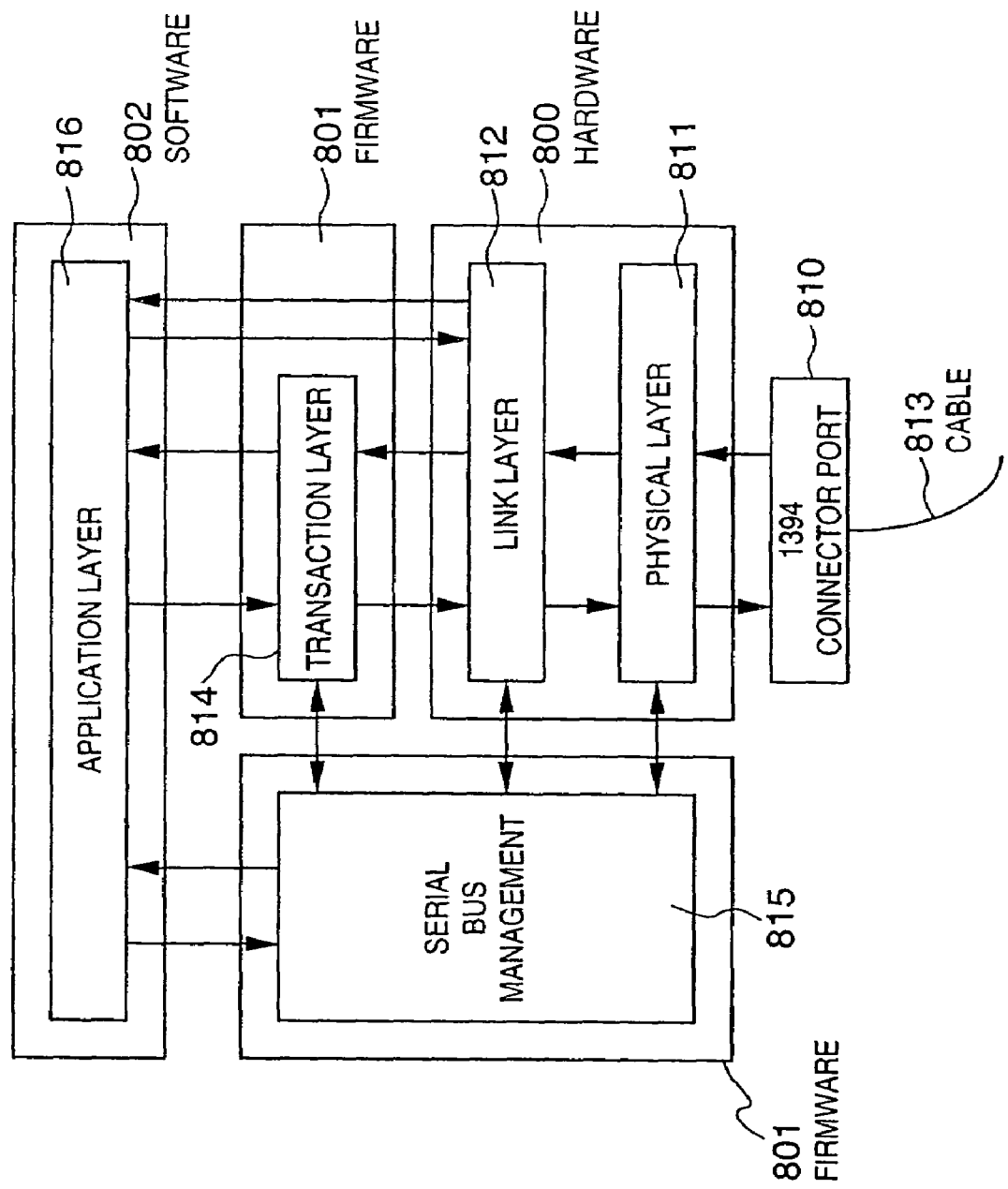
FIG. 2 is a block diagram illustrating a structure of the 1394 serial bus.

FIG. 2 is a block diagram illustrating a structure of the 1394 serial bus. The 1394 serial bus has a layered structure overall. As shown in FIG. 2, a connector port 810 is connected to a connector at the distal end of a 1394 serial bus cable 813. A physical layer 811 and link layer 812 that are formed by hardware 800 serve as upper layers of the connector port 810. The hardware 800 is made of an interface chip. The physical layer 811 of the hardware 800 performs coding, connection-related control, and the like. The link layer 812 performs packet transfer, cycle-time control, and the like.

A transaction layer 814 of firmware 801 manages data to be transferred (transacted) and issues read, write, and lock instructions. A management layer 815 of the firmware 801 manages the connection statuses and IDs of respective devices connected to the 1394 serial bus, as well as the configuration of the network. The hardware and firmware make up the essential structure of the 1394 serial bus.

An application layer 816 of software 802 changes depending upon the software used. How to transfer data on the interface is defined by a printer or a protocol such as an AV/C protocol.

Figure 3:
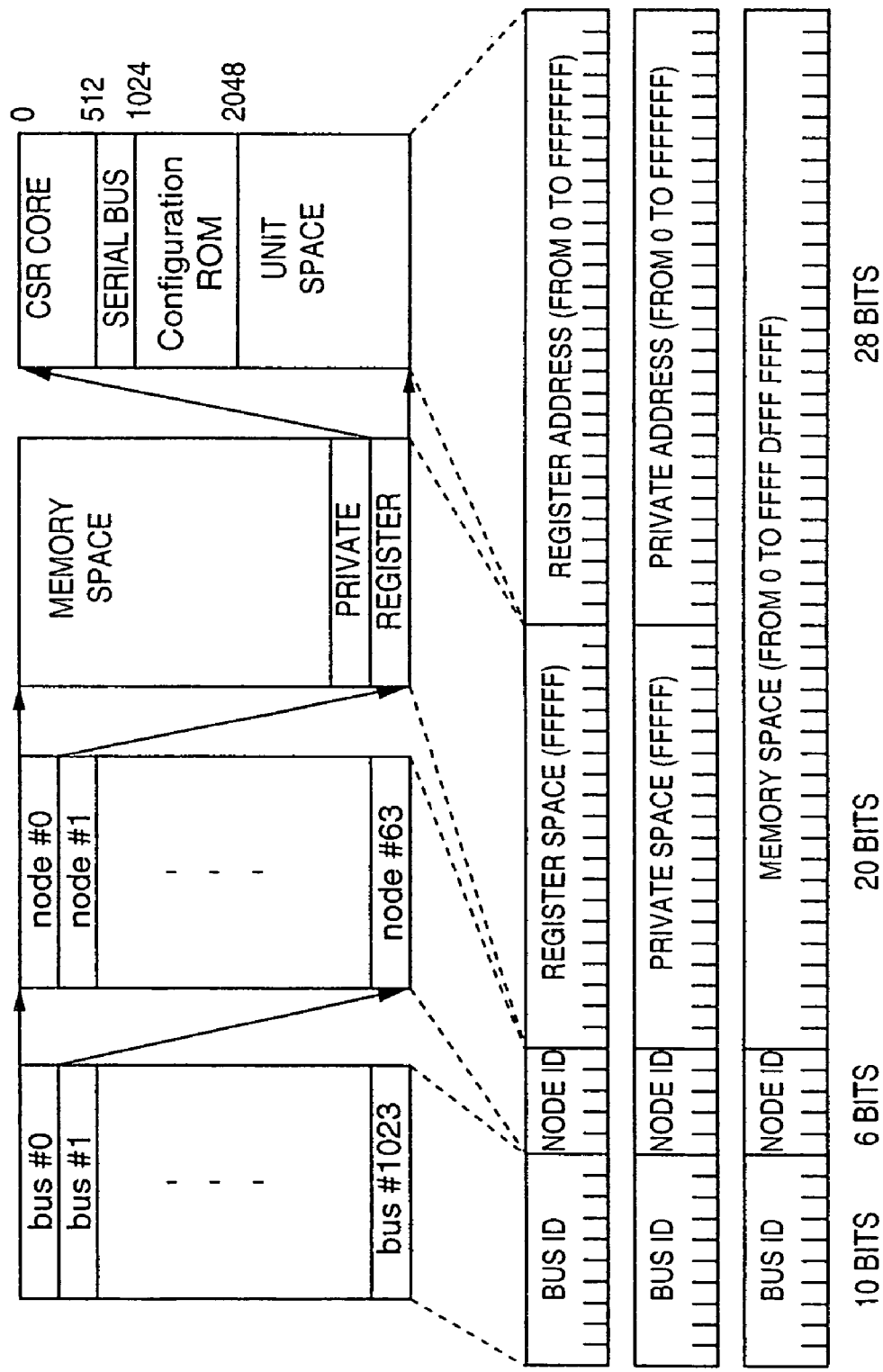
FIG. 3 is a view illustrating an address space of the 1394 serial bus.

FIG. 3 is a view illustrating an address space of the 1394 serial bus. Each device (node) connected to the 1394 serial bus always possesses a 64-bit address that is specific to the node. The address is stored in the memory of the device. The own node address and the node address of another node are recognized at all times to make it possible to perform data communication in which the other party is specified.

Addressing a 1394 serial bus is performed in compliance with the standard of IEEE 1212. An address is set using the first 10 bits to specify a bus number and the next six bits to specify a node ID number.

The remaining 48-bit address used in each device is divided into 20 bits and 28 bits, which are used with a 256-Mbyte unit structure. In the first 20-bit address space, 0 to 0×FFFFD are called a memory space; 0×FFFFE, a private space; and 0×FFFFF, a register space. The private space has addresses that can be freely used in the device. The register space has information common to devices connected to the bus, and is used for communication between the respective devices.

A register (CSR core) serving as the core of the CSR architecture is set in the first 512 bytes of the register space. A serial bus register and configuration ROM are respectively set in the next 512 bytes and 1,024 bytes. The remaining bytes form a unit space where a register unique to a device is set.

In general, the node should use only the first 2,048 bytes of the initial unit space in order to simplify the design of different types of bus systems. As a result, the CSR core, the serial bus register, the configuration ROM, and the first 2,048 bytes of the unit space are desirably made up of 4,096 bytes in all.

The foregoing is an overview of the 1394 serial bus. The features of the 1394 serial bus will now be described in greater detail.

<Details of the 1394 Serial Bus>

[Electrical Specifications of the 1394 Serial Bus]

Figure 4:
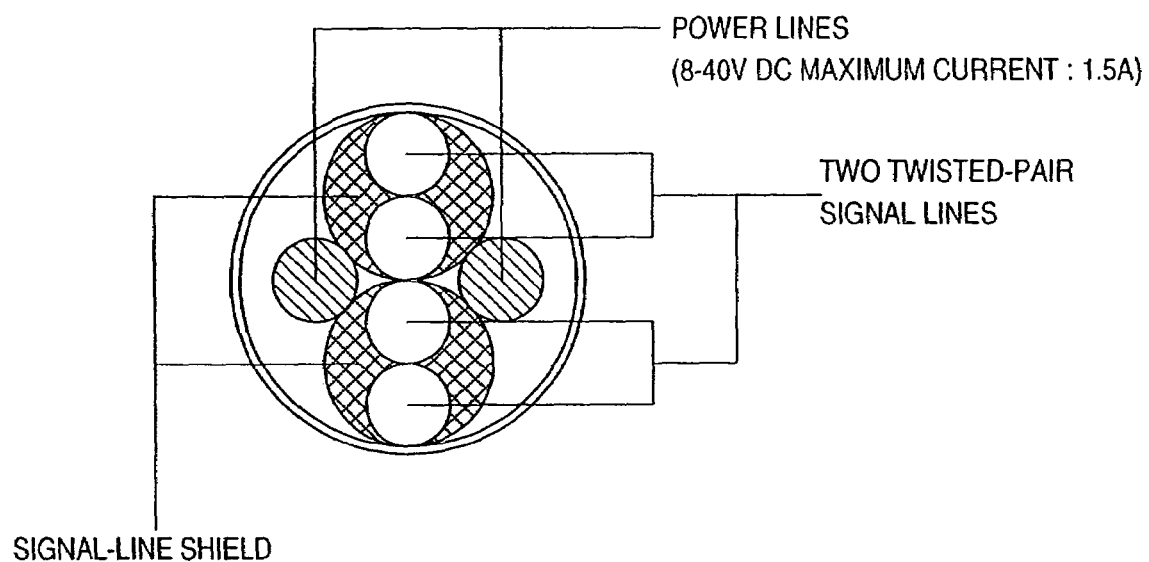
FIG. 4 is a sectional view illustrating the cable of the 1394 serial bus.

FIG. 4 is a sectional view illustrating the 1394 serial bus cable. The 1394 serial bus cable contains power-supply lines in addition to two twisted-pair signal conductors. This makes it possible to supply power to a device not having a power source and to a device whose voltage has dropped due to failure. The voltage of a DC power supplied from the power-supply lines is set to 8 to 40 V, and the current is set to a maximum of 1.5 A DC. Note that a standard called a DVD cable is made up of four conductors except for the power lines.

[DS-Link Coding]

Figure 5:
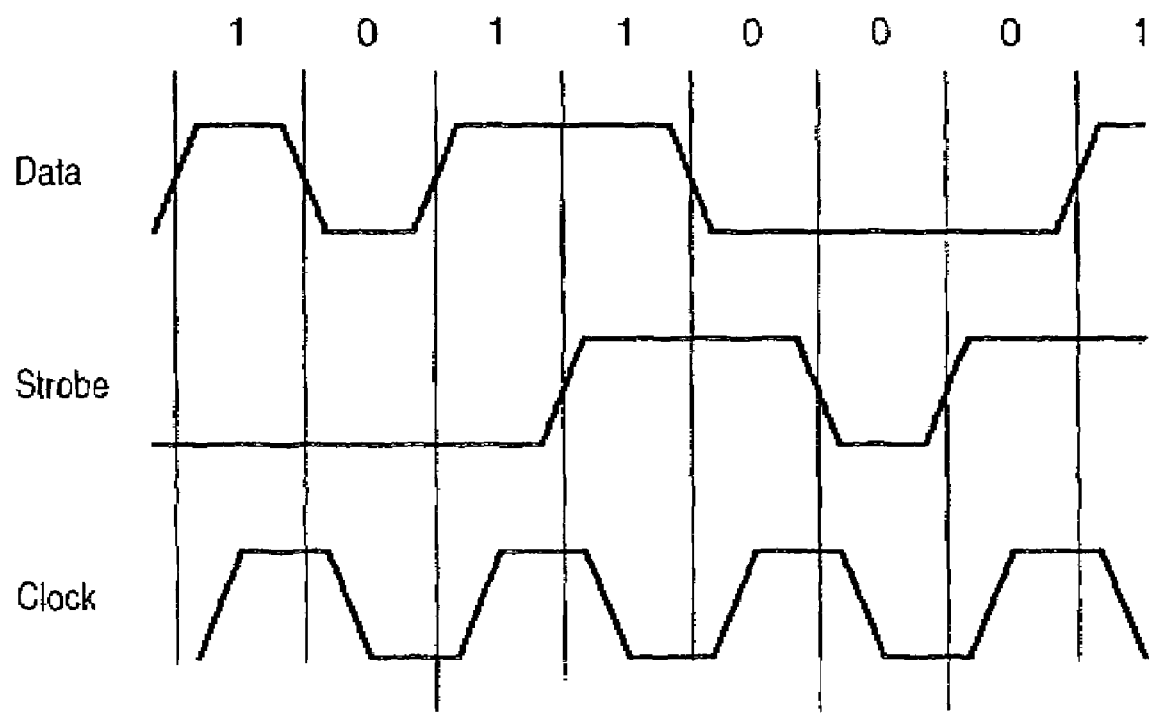
FIG. 5 is a diagram useful in describing the DS-link coding scheme of a data transfer format adopted in the 1394 serial bus.

FIG. 5 is a diagram useful in describing the DS-link (Data/Strobe link) coding scheme of a data transfer format employed in the 1394 serial bus.

DS-link coding is suited to high-speed serial-data communication, and requires two twisted-pair signal lines. One twisted-pair line sends a data signal, and the other sends a strobe signal. On the receiving side, a clock can be generated by taking the exclusive-OR between the data signal and strobe signal. The DS-link coding scheme exhibits the following effects. (1) When the DS-link coding scheme is used, no clock signal need be mixed in a data signal, and the transfer efficiency is higher than other serial-data transfer schemes. (2) Since a clock signal can be generated, the phase-locked loop (PLL) circuit can be omitted to reduce the scale of the controller LSI circuitry. (3) Information representing an idle state need not be sent when no data need be transferred. This allows setting the transceiver device of each device to a sleep state, thereby reducing the power consumption.

[Bus-Reset Sequence]

A node unique ID (to be also referred to as a "node ID" hereinafter) is assigned to each device (node) connected to the 1394 serial bus so that the device is recognized as a node constituting a network. For example, when the number of nodes increases/decreases by plugging/unplugging a network device or turning on/of the power source, i.e., the network configuration changes, and a new network configuration must be recognized, a node which has sensed the change transmits a bus-reset signal to the bus to set a mode in which the new network configuration is to be recognized. The change in network configuration is sensed by sensing a change in bias voltage in the connector port 810.

Upon being transmitted a bus-reset signal from a certain node, the physical layer 811 of each node receives the bus-reset signal and, at the same time, reports occurrence of the bus reset to the link layer 812 and sends the bus-reset signal to the other nodes. After all nodes have eventually received the bus-reset signal, a bus-reset sequence is activated. The bus-reset sequence can also be activated when the cable is plugged/unplugged, when the hardware detects network anomalies, or when an instruction is directly issued to the physical layer 811 by host control from the protocol. When the bus-reset sequence is activated, data transfer is temporarily suspended during the bus reset. After the bus reset is completed, data transfer is resumed on the basis of the new network configuration.

[Node-ID Decision Sequence]

In order for each of the nodes to construct the new network configuration after bus reset, an operation for assigning an ID to each node begins. The usual sequence from bus reset to determination of node IDs will be described with reference to the flowcharts of FIGS. 6 to 8.

Figure 6:
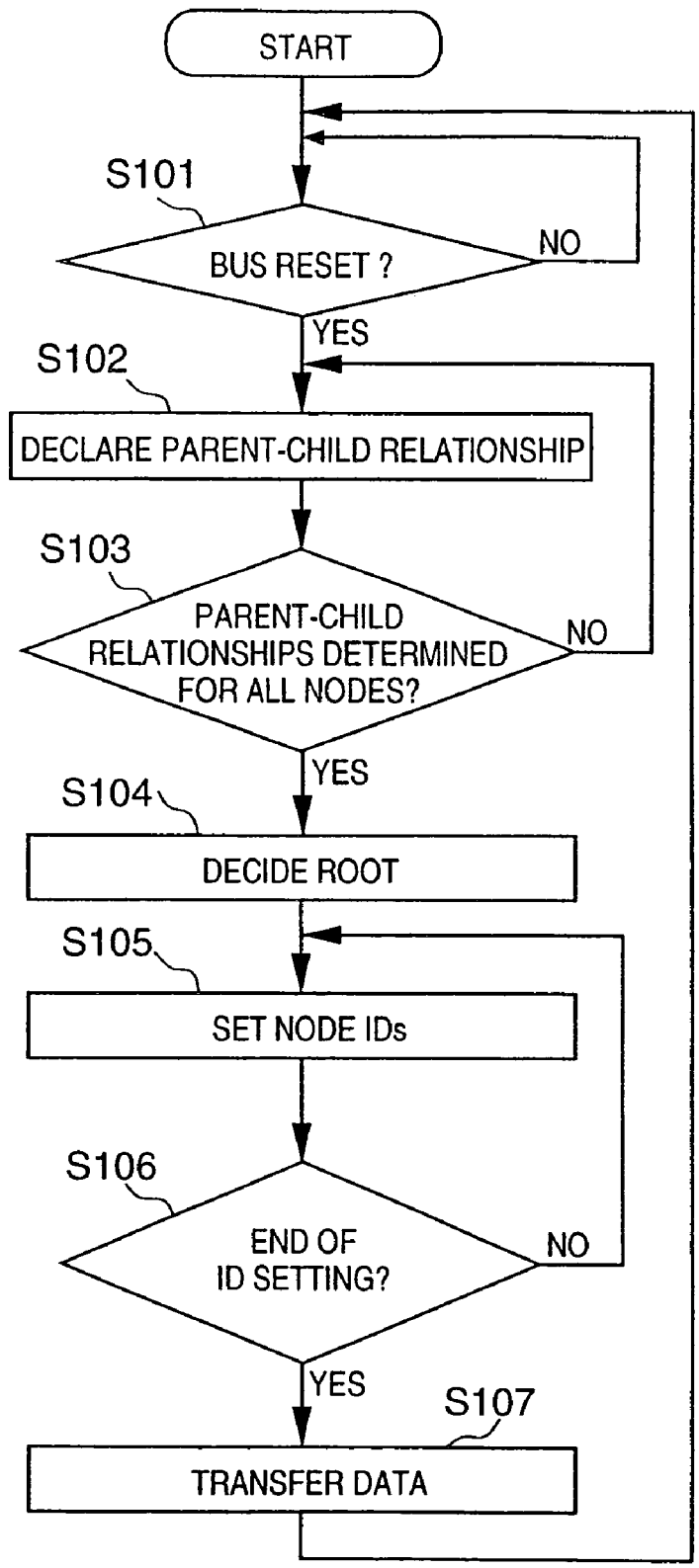
FIG. 6 is a flowchart illustrating a sequence before a node ID is determined to enable data transfer after a bus-reset signal is generated.

FIG. 6 is a flowchart illustrating a sequence from generation of a bus-reset signal to determination of node IDs and data transfer. Each node monitors generation of a bus-reset signal at step S101. When a bus-reset signal is generated, control proceeds to step S102 to make a declaration of parent-child relationship between directly connected nodes in order to ascertain the new network configuration from reset state of the network configuration. Step S102 is repeated until the parent-child relationships have been determined between all nodes at step S103.

If the parent-child relationships have been determined, control proceeds to step S104 to decide a root. A node-ID setting operation for providing each node with an ID is carried out at step S105. Node IDs are set in a predetermined node sequence and the setting operation is performed repeatedly until all nodes are determined at step S106 to be provided with IDs.

When the setting of node IDs is completed, the new network configuration will have been recognized at all nodes and a state will be attained in which data transfer between nodes can be carried out. Data transfer thus begins at step S107. The sequence returns to step S101 to monitor generation of a bus-reset signal again.

Figure 7:
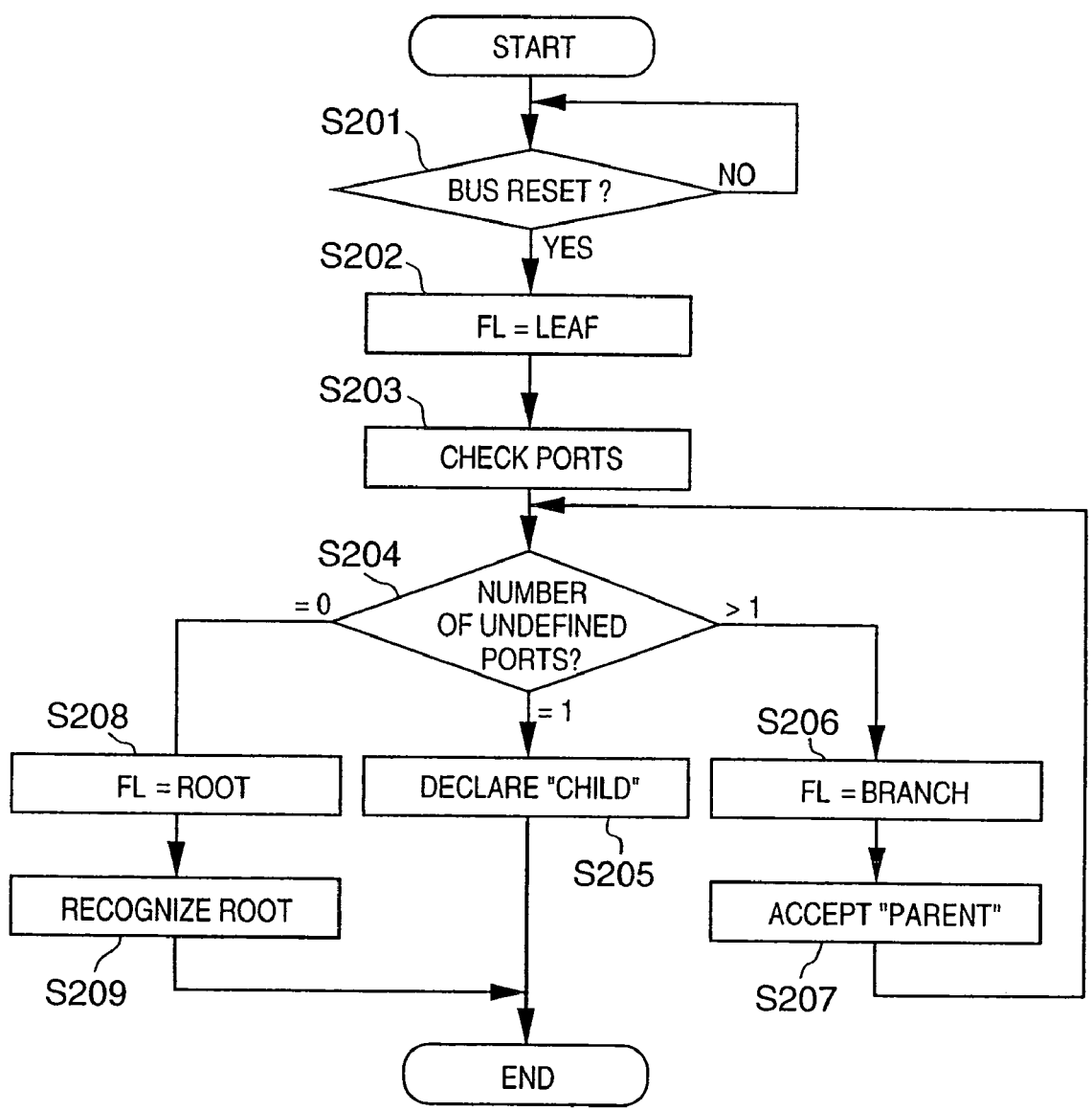
FIG. 7 is a flowchart illustrating a detailed example from monitoring of a bus-reset signal to determination of a root node.
Figure 8:
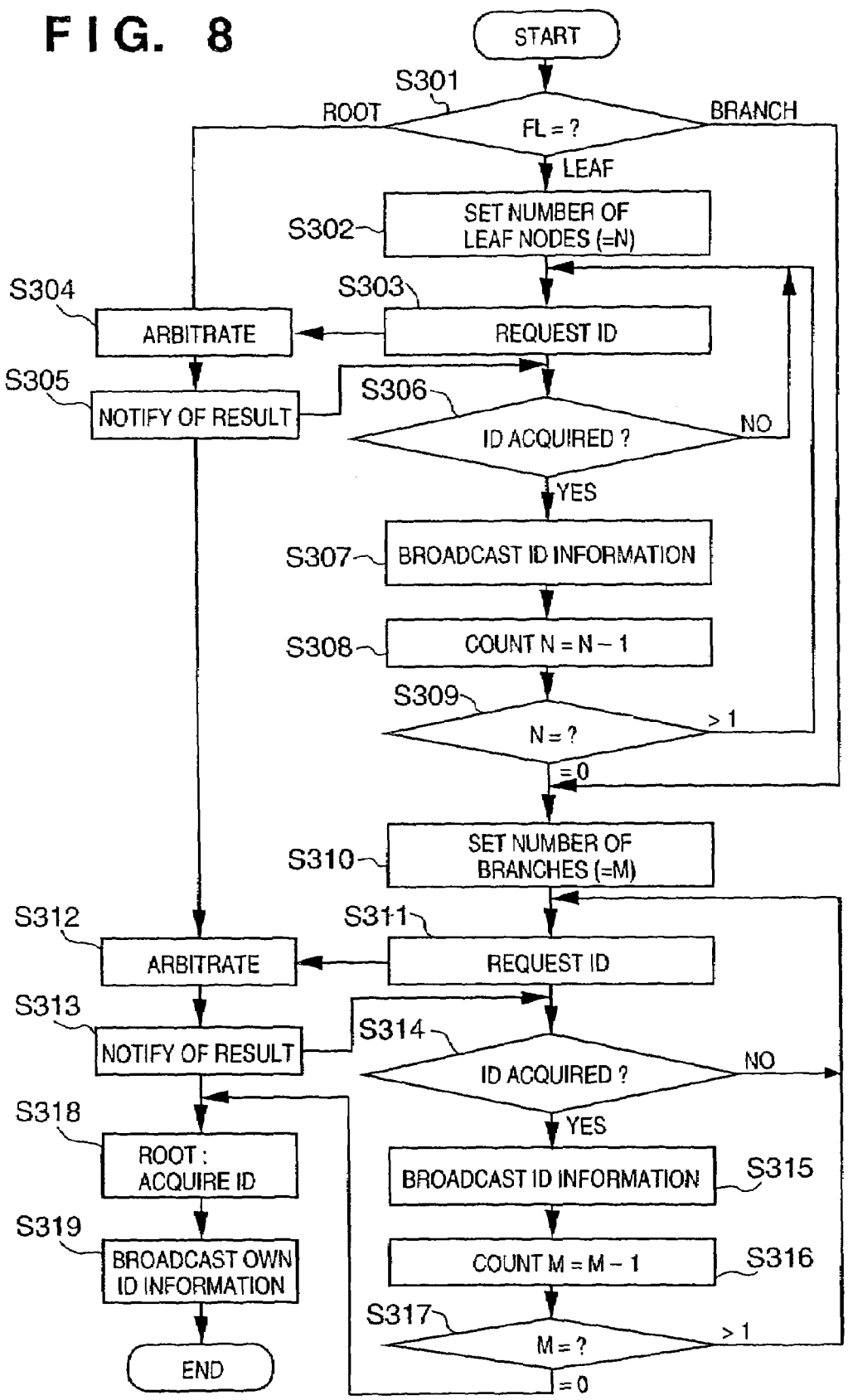
FIG. 8 is a flowchart illustrating a detailed example of node ID setting.

FIG. 7 is a flowchart illustrating a detailed example from monitoring of a bus rest signal (S101) to determination of a root node (S104). FIG. 8 is a flowchart illustrating a detailed example of node ID setting (S105 and S106).

In FIG. 7, when generation of a bus-reset signal is monitored and occurs at step S201, the network configuration is reset temporarily. At step S202, each device resets a flag FL indicative of a leaf node as the first step of an operation for re-recognition of the reset network configuration. At step S203, each device determines the number of ports, i.e., the number of own ports connected to other devices. This is followed by step S204, at which the number of undefined ports (ports for which the parent-child relationship has not been determined) is checked, based upon the results at step S203, in order to begin to declare parent-child relationship. At this time, the number of ports to which other devices are connected is equal to the number of undefined ports immediately after bus reset. However, as parent-child relationships are decided, the number of undefined ports sensed at step S204 decreases.

Immediately after bus reset, nodes that can make declarations of parent-child relationship first are limited to leaf nodes. A node can ascertain whether it is a leaf node from the number of ports confirmed at step S203. That is, a node whose number of ports is "1" is a leaf node. The leaf node declares with respect to a node connected to it that "This node is the child and the other node is the parent" at step S205. This operation then ends.

A node whose number of connected ports is "2 or more" at step S203, i.e., a branch point has "the number of undefined ports >1" immediately after bus reset. As a result, control proceeds to step S206. Data indicative of a branch node is set at the flag FL. This is followed by step S207, at which the node waits for the declaration of the parent-child relationship from another node. Another node makes the declaration of the parent-child relationship and the branch node that received this returns to step S204 to check the number of undefined ports. If the number of undefined ports is "1", it is possible to declare "This node is a child and the other node is a parent" at step S205 to another node connected to the remaining port. A branch node whose number of undefined ports is still "2 or more" waits for the declaration of the parent-child relationship from another node at step S207.

When any one branch node (or, in exceptional cases, a leaf node because the leaf node did not operate quickly enough to issue the "Child" declaration) indicates "0" as the number of undefined ports, the declarations of the parent-child relationship for the entire network end as a result. The sole node for which the number of undefined ports has become "0", i.e., which has been determined as a parent for all the nodes sets data indicative of a root node at the flag FL at step S208, and this node is recognized as a root at step S209.

This ends the procedure from bus reset to declaration of the parent-child relationships between all nodes of the network.

A procedure for assigning an ID to each node will now be described. An ID can be first set for a leaf node. Then, IDs are set in the order of a leaf→branch→root from smaller numbers (node number: 0).

At step S301 of FIG. 8, control branches to processes corresponding to the kinds of node, i.e., a leaf, branch, and root based upon data set at the flag FL.

For a leaf node, the number (natural number) of leaf nodes that exist in the network is set to a variable N at step S302. Each leaf then requests the root node to be given a node number at step S303. In a case where there are a plurality of requests, the root node performs arbitration at step S304. The root node assigns a node number to a given node and notifies the remaining nodes of the result indicative of the node number acquisition failure.

A leaf node whose acquisition of an ID ended in failure at step S306 requests a node number again at step S303. A leaf node that has acquired a node number broadcasts the ID information including the acquired node number to inform all nodes of the ID information at step S307. When the broadcast of the ID information ends., the variable N representing the number of leafs is decremented at step S308. Until the variable N is determined to be "0" at step S309, the procedure from steps S303 to S308 is repeated. After all leaf nodes have broadcast their ID information, control proceeds to step S310, at which the ID setting of branch nodes is carried out.

The setting of branch node IDs is performed in a manner similar to that for leaf nodes. The number (natural number) of branch nodes that exist in the network is set to a variable M at step S310. Each branch node then requests the root node to be given a node number at step S311. In response to this request, the root node performs arbitration at step S312 and assigns a given branch node a number that follows those already assigned to leaf nodes. At step S313, the root node notifies a branch node that has failed in acquiring a node number of the result representing the acquisition failure.

A branch node that has been notified of the node number acquisition failure from determination of step S314 requests a node number again at step S311. A branch node that has acquired a node number broadcasts the ID information including the acquired node number to inform all nodes of the ID information at step S315. When the broadcast of the ID information ends, the variable M representing the number of branches is decremented at step S316. Until the variable M is determined to be "0" at step S317, the procedure from steps S311 to S316 is repeated. After all branch nodes have broadcast their ID information, control proceeds to step S318, at which the ID setting of root nodes is carried out.

When processing thus far ends, a node which has not yet acquired any ID is a root node only. The root node sets the smallest number unassigned to another node as the own ID number at step S318 and broadcasts the root ID information at step S319.

The procedure up to the setting of IDs for all nodes ends. A detailed procedure of the node-ID decision sequence will be explained with respect to the network example shown in FIG. 9.

Figure 9:
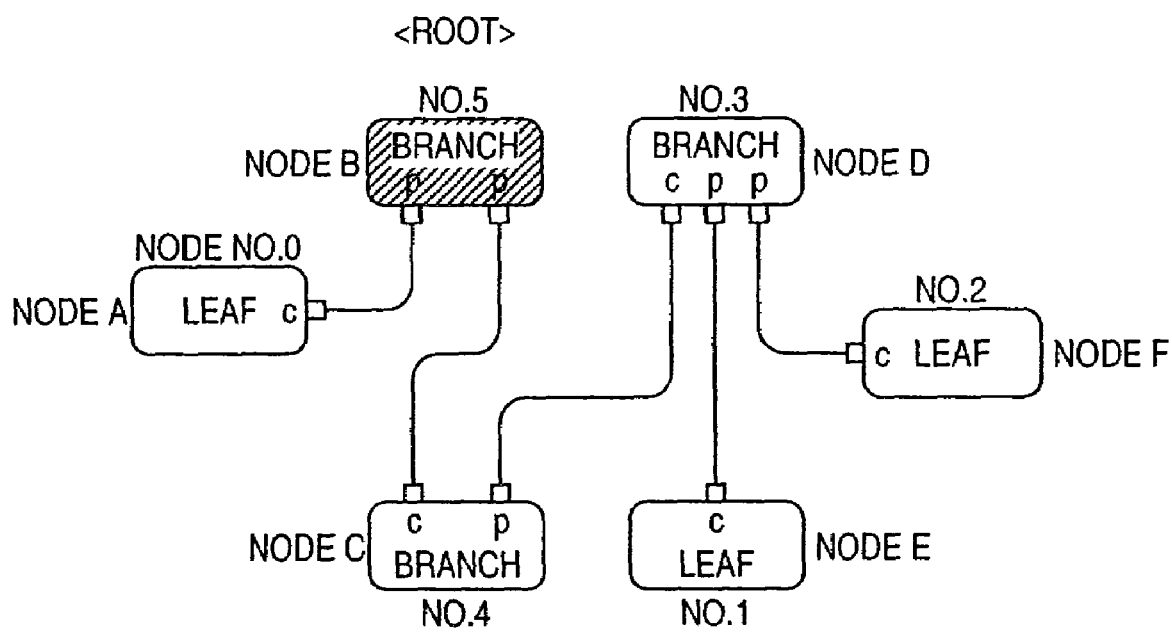
FIG. 9 is a diagram illustrating a network operation of the 1394 serial bus.

The network shown in FIG. 9 is such that nodes A and C are directly connected as a lower layer of node B (the root), node D is directly connected as a lower layer of node C, and nodes E and F are directly connected as a lower layer of node D. This hierarchical structure and a procedure for determining the route node and node IDs will be described below.

In order to recognize the connection status of each node after bus reset, a declaration of the parent-child relationship is made between the ports at which the nodes are directly connected. A "parent" is an upper layer in the hierarchical structure and the "child" is a lower layer. In FIG. 9, the node that issues the declaration on parent-child relationship first following bus reset is the node A. As described above, declaration of the parent-child relationship can start from a node (leaf) connected at only one port. A node whose number of ports is "1" is recognized to be at a terminus of the network, i.e., to be as a leaf node. The parent-child relationships are determined one after another starting from leaf nodes that go into operation earliest. The port of the node that has issued the declaration of the parent-child relationship is set as a "child" of the two nodes connected to each other, and the port of the other node is set as a "parent". Accordingly, it is determined that nodes A and B, nodes E and D, and nodes F and D are child-parent related, respectively.

Nodes one layer higher have a plurality of connected ports. These nodes are referred to as branches. Among these nodes, those that have received declarations of the parent-child relationship from other nodes issue declarations of the parent-child relationship in succession and to upper nodes. In FIG. 9, after the parent-child relationships are determined between nodes D and E, and nodes D and F, node D issues the declaration of the parent-child relationship with respect to node C. As a result, the "child-parent" relationship is set between nodes D and C. Node C, which has received the declaration of parent-child relationship from node D, issues a declaration of parent-child relationship with regard to node B, which is connected to the other port of node C. As a result, the "child-parent" relationship is set between nodes C and B.

Thus, the hierarchical structure as shown in FIG. 9 is constructed and node B, which is the parent to all connected nodes, is eventually determined to be the root node. Only one root node can exist in one network configuration. If node B, which has received the declaration of parent-child relationship from node A, issues its declaration of parent-child relationship to other nodes at an early timing, there is the possibility that the root node will shift to another node such as node C. In other words, depending upon the timing at which the declaration of parent-child relationship is transmitted, any node can become the root node, and in one and the same network configuration, the specific node is not always a root node.

After the root node is decided, a transition is made to a mode for deciding the node IDs. All nodes have a broadcast function of communicating their own ID information to all other nodes. Note that the ID information is broadcasted as one including the node number, information on the connection position, the number of connected ports or information on the parent-child relationship of each port.

Assignment of node numbers begins from leaf nodes, as described above. Node numbers=0, 1, 2, . . . are assigned to these nodes in regular order. By broadcasting ID information, the node number is recognized as being already assigned.

If all leaf nodes have finished acquiring their node numbers, then operation shifts to branch nodes so that node numbers are assigned to branch nodes after leaf nodes. In a manner similar to that of the leaf nodes, branch nodes to which node numbers have been assigned broadcast their ID information in succession. Finally, the root node broadcasts its own ID information. Hence, the root node always possesses the largest node ID number.

Thus, the ID setting of the entire hierarchical structure ends, the network configuration is reconstructed and the bus initialization operation is completed.

[Control Information for Node Management]

CSR cores shown in FIG. 3 exist in registers as the basic function of the CSR architecture for performing node management. FIG. 10 illustrates the positions and functions of these registers. The offset in FIG. 10 is a relative position from 0xFFFFF0000000.

In the CSR architecture, registers concerning the serial bus are set from 0xFFFFF0000200. FIG. 11 illustrates the positions and functions of these registers.

Information about the node resource of the serial bus is set at a position starting from 0xFFFFF0000800. FIG. 12 illustrates the positions and functions of these registers.

The CSR architecture has a configuration ROM in order to represent the function of each node. This ROM takes a minimum format or general format and is set from 0xFFFFF0000400. As shown in FIG. 13, the minimum format represents only a vendor ID, and the vendor ID has a unique value in the world that is expressed by 24 bits.

Figure 14:
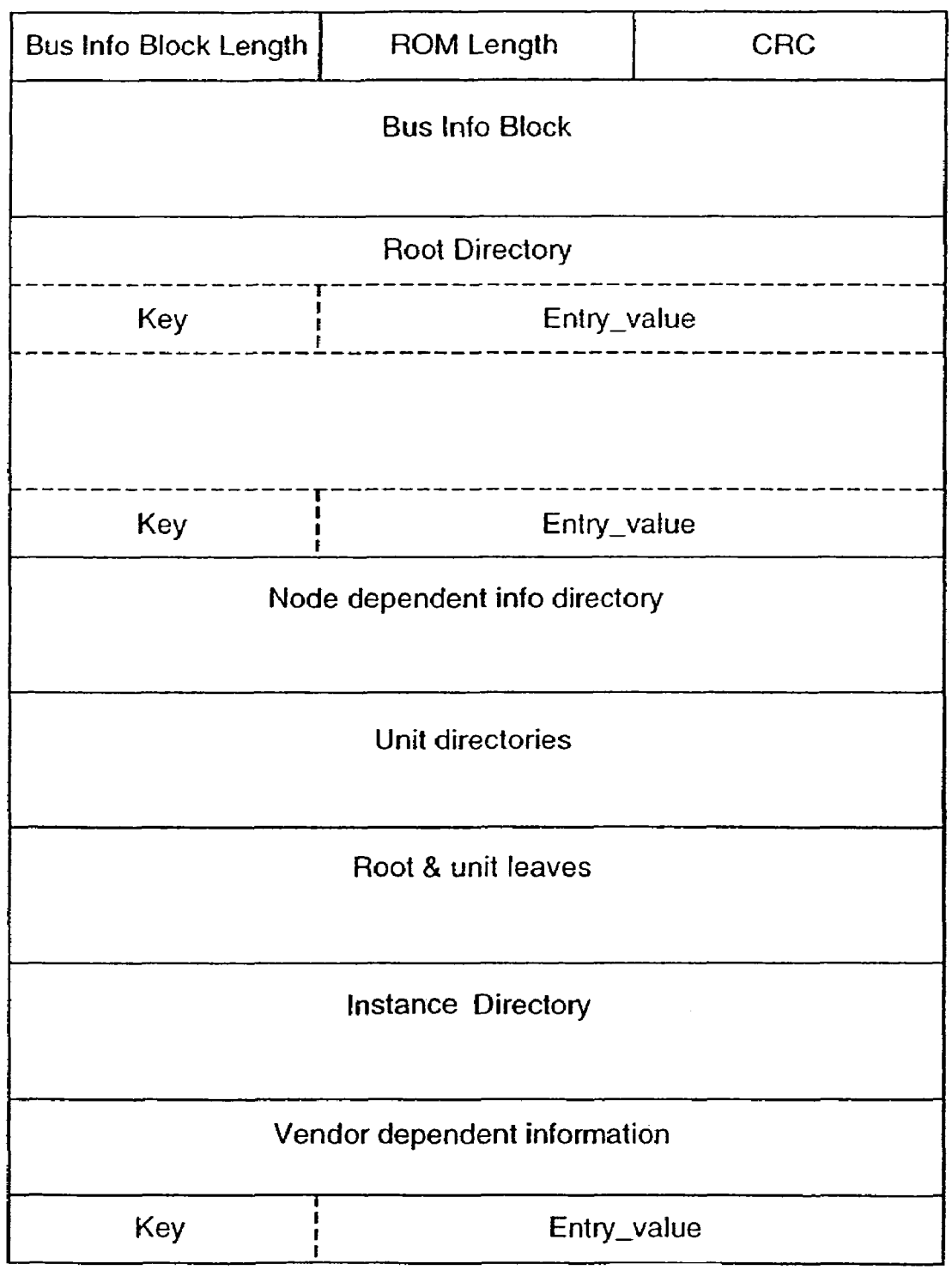
FIG. 14 is a diagram illustrating the general format of the configuration ROM of the 1394 serial bus.

The general format has information about nodes in a format as shown in FIG. 14. The vendor ID in this case can be set in the Root Directory. Each device can hold a node unique ID as a means for identifying the device in Bus Info Block and Root Leaf. This ID is made up of 64 bits, upper 24 bits of which represent a device manufacturer ID assigned by the IEEE, and lower 48 bits of which can be freely set by the manufacturer. The node unique ID determines a specific ID (device number) unique to one device in the world regardless of the manufacturer and model. The device number is used to recognize a node continuously after resetting such as bus reset.

Note that the Bus Info Block in the configuration ROM of the general format includes a 1394 ASCII code and information about whether the node can function as an isochronous resource manager, cycle master, or bus master. The Root Directory includes information indicative of a vendor ID and node function. The Unit Directory includes information indicative of the type of unit and driver software version.

The Root Directory can hold the basic information of the node device.

Information about a software unit supported by the device can be held in a subdirectory (Unit directory) offset from the Root Directory. In general, this subdirectory holds information about a data transfer protocol and command set for performing data communication between devices on the IEEE 1394 bus.

In addition, the configuration ROM can hold device unique information (Node dependent info). This information is held as a Node dependent info directory in the form of a subdirectory offset from the Root Directory.

The configuration ROM can be extended to have a subdirectory (Instance Directory) for storing information about functions supported by the device and accessory information.

Data to be stored in the ROM are assigned with keyvalues in accordance with a predetermined format and rule. By decoding the keyvalues, the type of information can be identified.

Note that the detailed structure of the configuration ROM is described in the ISO/IEC 13213, IEEE Std 1212, and IEEE Std 1394–1995, and a description thereof will be omitted.

[Serial Bus Management]

As shown in FIG. 2, the protocol of the 1394 serial bus is made up of the physical layer 811, link layer 812, and transaction layer 814. Among them, bus management provides a basic function for node control and bus resource management based upon the CSR architecture.

Only one node for performing bus management (to be referred to as a "bus management node" hereinafter) exists on a single bus and provides another node on the serial bus with a management function. The management function includes cycle master control, performance optimization, power management, transfer speed management, and configuration management.

The bus management function is roughly divided into three functions, i.e., a bus manager, isochronous resource manager, and node control. Node control is a management function which enables communication between nodes in the physical layer 811, link layer 812, transaction layer 814, and application. The isochronous resource manager is a management function necessary for transferring isochronous data on the serial bus, and manages assignment of the isochronous data transfer bandwidth and channel number. To perform this management, a bus management node is dynamically selected from nodes having the isochronous resource manager function after bus initialization.

In a configuration in which no bus management node exists on the bus, some functions of the bus management such as power management and cycle master control are executed by a node having the isochronous resource manager function. Further, bus management is a management function for carrying out services for providing an application with a bus control interface, and includes a serial bus control request (SB_CONTROL.request), serial bus event control confirmation (SB_CONTROL.confirmation), and serial bus event indication (SB_EVENT.indication).

The serial bus control request is used-when an application requests bus reset, bus initialization, bus state information, and the like to the bus management node. Serial bus event control confirmation is the result of the serial bus control request, and notified from the bus management node to the application. Serial bus event indication notifies the application from the bus management node of events that occur asynchronously.

[Data Transfer Protocol]

Data transfer on the 1394 serial bus simultaneously includes both isochronous data (isochronous packet) which must be periodically transmitted and asynchronous data (asynchronous packet) for which data transmission/reception at an arbitrary timing is permitted. Further, this data transfer guarantees real-time transfer of isochronous data. In data transfer, bus access is requested prior to transfer, and bus arbitration for granting bus access is executed.

In asynchronous transfer, a transmission node ID and reception node ID are transferred as packet data together with transfer data. The reception node confirms its own node ID, receives a packet, and returns an acknowledge signal to the transmission node. Then, one transaction ends.

In isochronous transfer, the transmission node requests an isochronous channel together with the transfer speed, and transmits a channel ID as packet data together with transfer data. The reception node confirms a desired channel ID and receives the data packet. The number of necessary channels and transfer speed are determined by the application layer 816.

These data transfer protocols are defined by the three, physical layer 811, link layer 812, and transaction layer 814. The physical layer 811 performs a physical/electrical interface with the bus, automatic recognition of node connection, and bus arbitration of bus access between nodes. The link layer 812 performs addressing, data check, packet transmission/reception, and cycle control for isochronous transfer. The transaction layer 814 performs processing concerning asynchronous data. Processing in each layer will be explained.

[Physical Layer]

Bus arbitration in the physical layer 811 will be described.

With a 1394 serial bus, arbitration for bus access is always carried out before data transfer. Respective devices connected to the 1394 serial bus relay signals transferred in the network to construct a logical bus-type network for transmitting the same signal to all devices in the network. Consequently, arbitration is necessary to prevent collision of packets. As a result, only one node can perform transfer at a certain time.

Figure 15:
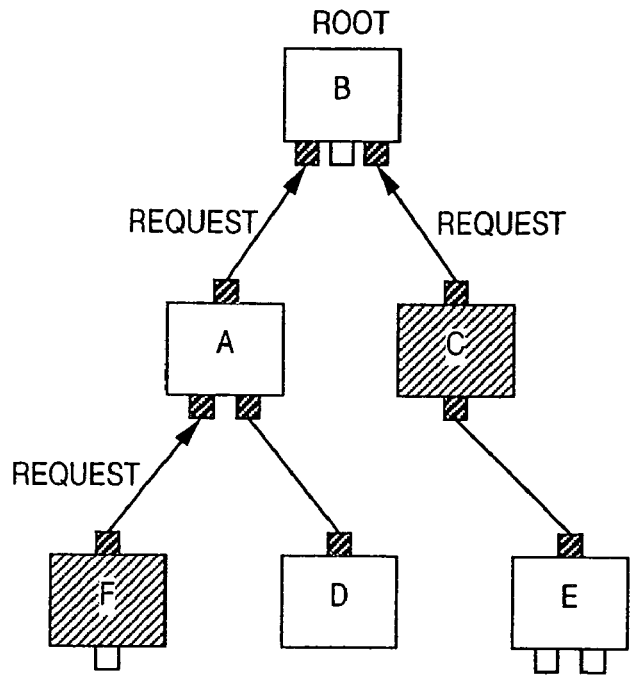
FIG. 15 is a diagram useful in describing a request for bus access.
Figure 16:
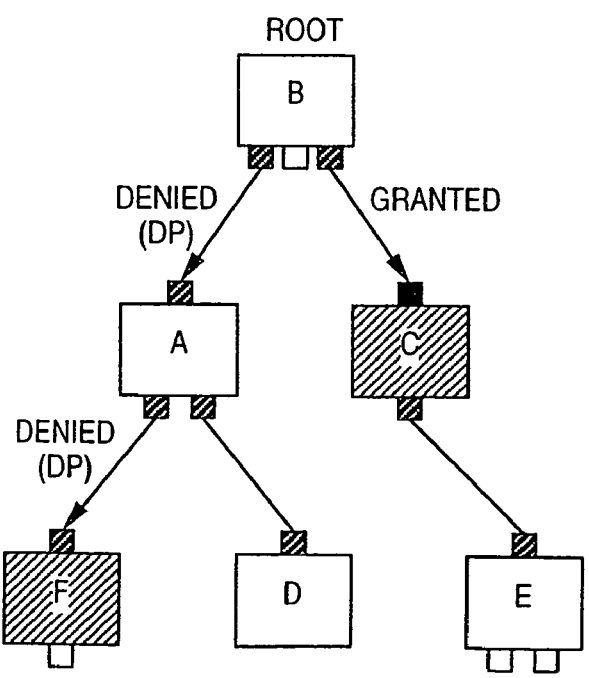
FIG. 16 is a diagram useful in describing bus access granted.

FIG. 15 is a diagram useful in describing a request for bus access, and FIG. 16 is a diagram useful in describing bus access granted. When arbitration starts, one or a plurality of nodes each sends the parent node a request for bus access privilege. In FIG. 15, nodes C and F are the nodes issuing bus access requests. A parent node (node A in FIG. 15) that has received the request sends it to the parent node. This request eventually arrives at the root node that performs arbitration.

Upon receiving the bus access request, the root node decides which node should be granted access to the bus. Such arbitration is performed solely by the root node. The node that has won the arbitration is granted access to the bus. FIG. 16 shows a state in which bus access has been granted to node C and denied to node F.

A DP (Data Prefix) packet is sent to the node that lost the bus arbitration, thereby informing this node of refusal. The bus access request from the refused node waits for the next arbitration.

Figure 17:
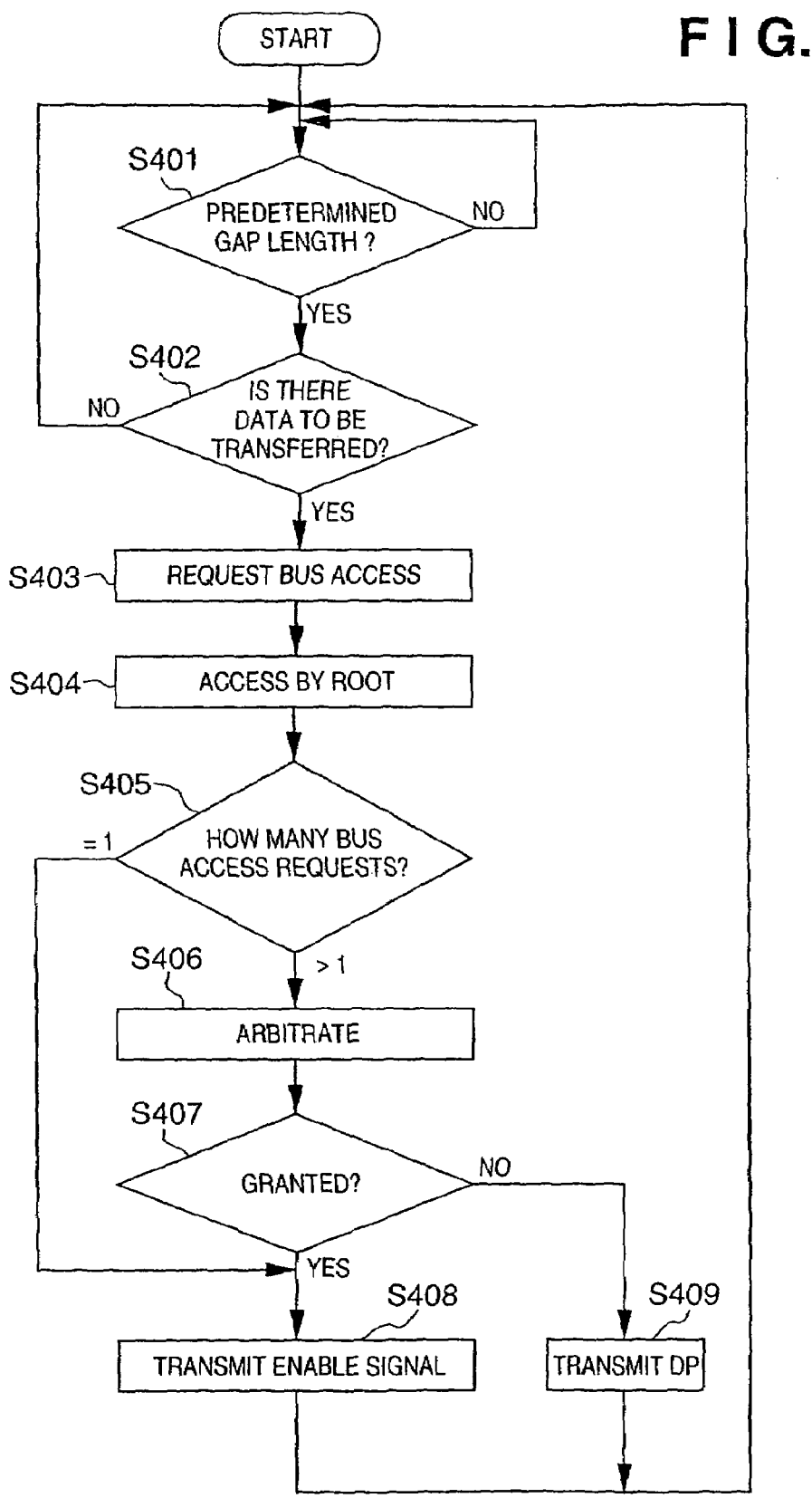
FIG. 17 is a flowchart illustrating the flow of arbitration in the 1394 serial bus.

The node that won the arbitration and was granted bus access can start transferring data. The flow of bus arbitration will be described with reference to the flowchart of FIG. 17.

In order for a node to start data transfer, it is necessary that the bus be in an idle state. In order to confirm that the bus is currently idle following the end of data transfer performed previously, the lapse of a predetermined idle-time gap length (e.g., a subtraction gap) set separately in each transfer mode is detected, and if the predetermined gap length is detected, each node judges that the bus becomes idle. At step S401, each node checks whether a predetermined-gap length corresponding to data to be transferred such as asynchronous data or isochronous data has been detected. As long as the predetermined gap length is not detected, bus access needed to begin transfer cannot be requested.

If the predetermined gap length is detected at step S401, each node determines at step S402 whether there is data to be transferred. If there is such data, then, at step S403, the node sends a bus access request to the root. The signal representing the bus access request eventually arrives at the root while being relayed through each device in the network, as shown in FIG. 15. If it is found at step S402 that there is no data to be transferred, the node returns to step S401.

If the root node receives one or more bus access requests at step S404, then, at step S405, the root node checks the number of nodes that issued access requests. If it is found at step S405 that the number of nodes is one, then this node is provided with the bus access that will be allowed next. If it is found at step S405 that a plurality of nodes issued bus access requests, then the root node performs arbitration at step S406 to decide one node that is to be granted bus access. This arbitration operation assures that all devices have fair access to the bus and does not grant access only to the same node every time (fair arbitration).

Root node processing branches at step S407 in accordance with one node granted bus access by arbitration performed at step S406 and other nodes that lost the arbitration. When one node won the arbitration or requested bus access, at step S408, the root sends an enable signal to the one node. The node that has received the enable signal immediately starts transferring data (packet) that is to be transferred (step S410). A node that lost the arbitration is sent the DP (Data Prefix) packet, which represents refusal of the bus access request. Processing for the node which has received the DP packet returns to step S401 in order to request bus access again. Processing for the node that has transferred data at step S410 also returns to step S401.

[Transaction Layer]

Transactions are classified into three types, i.e., read transaction, write transaction, and lock transaction.

In read transaction, an initiator (request node) reads out data from a specific address of the memory of a target (response node). In write transaction, the initiator writes data on the specific address of the memory of the target. In lock transaction, the initiator transfers reference data and updated at a to the target. The reference data is combined with data at the target address to form a designation address that designates the specific address of the target. Data at this specific address is updated by update data.

Figure 18:
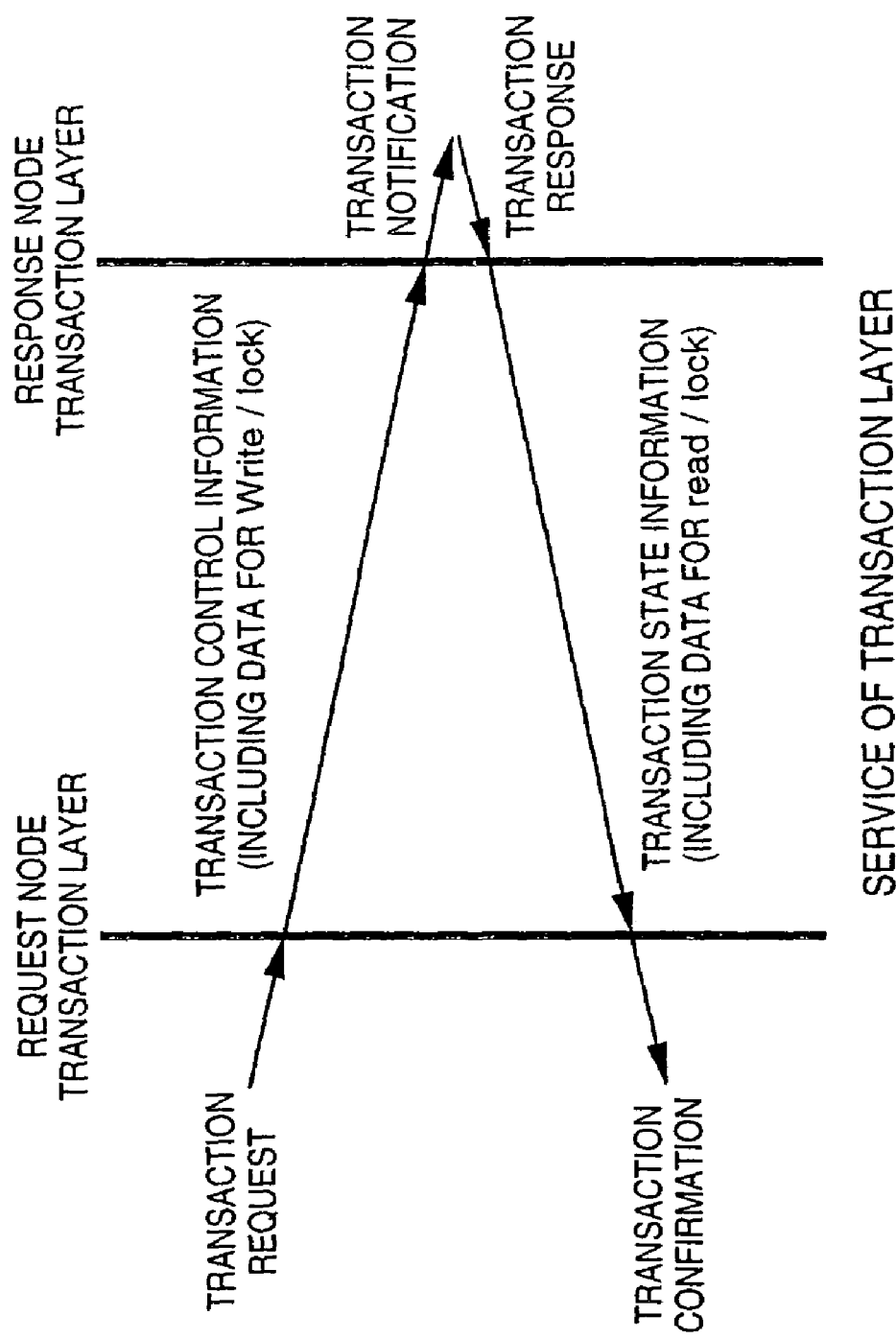
FIG. 18 is a diagram illustrating the request and response protocols of read, write, and lock commands based upon the CSR architecture in a transaction layer.

FIG. 18 is a diagram illustrating the request and response protocols of read, write, and lock commands based upon the CSR architecture in the transaction layer 814. Request, indication, response, and confirmation shown in FIG. 18 are service units in the transaction layer 814.

Transaction request (TR_DATA.request) is packet transfer to the response node, and transaction indication (TR_DATA.indication) is an indication that the response node has received a request. Transaction response (TR_DATA.response) is acknowledge transmission, and transaction confirmation (TR_DATA.confirmation) is acknowledge reception.

[Link Layer]

Figure 19:
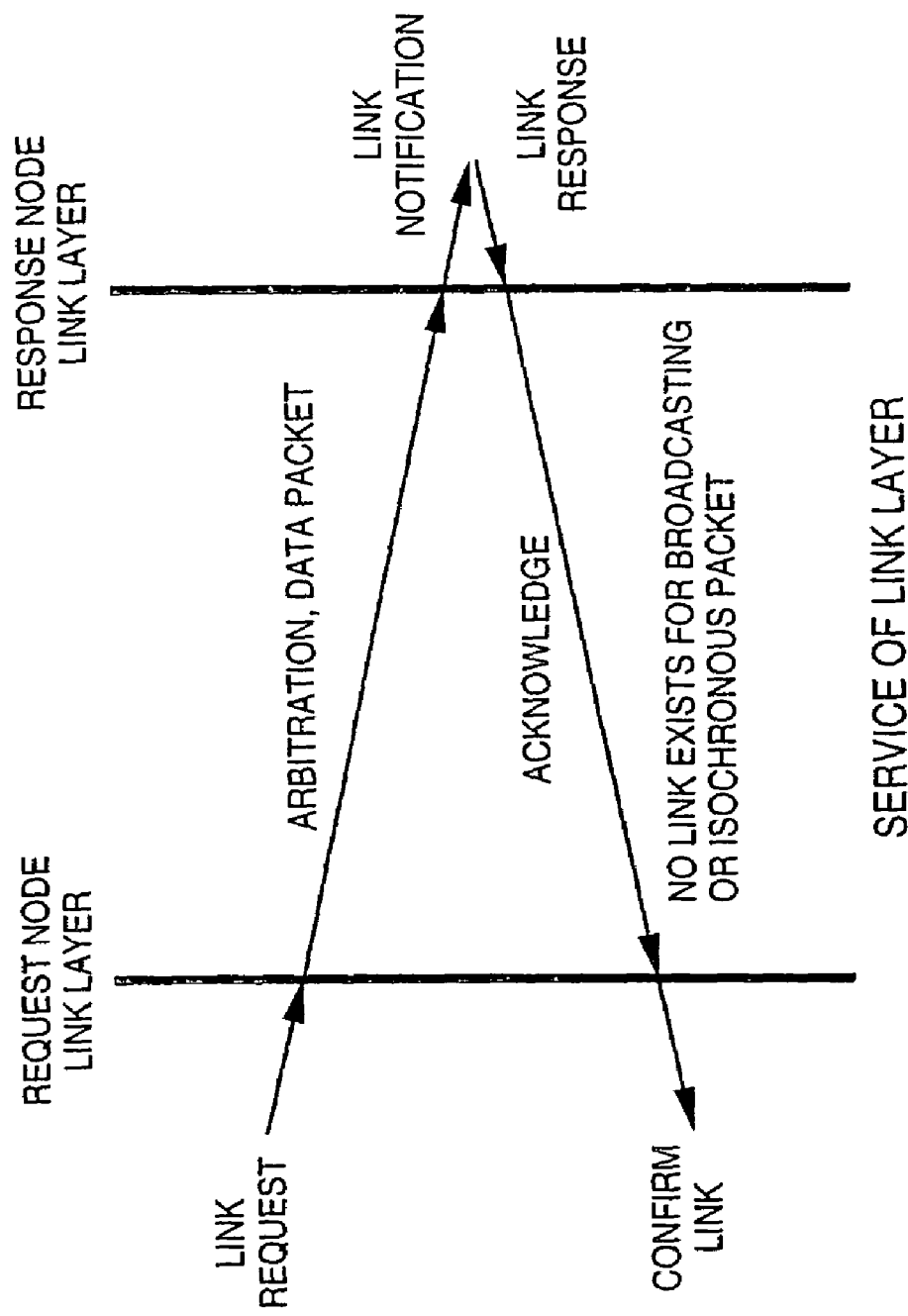
FIG. 19 is a diagram illustrating a service in a link layer.

FIG. 19 is a diagram illustrating a service in the link layer 812. This service is divided-into service units, i.e., link request (LK_DATA.request) which requests packet transfer to the response node, link indication (LK_DATA.indication) which indicates packet reception to the response node, link response (LK_DATA.response) for acknowledge transmission from the response node, and link confirmation (LK_DATA.confirmation) for acknowledge transmission to the request node. One packet transfer process is referred to as a "subaction". Subactions are classified into two, asynchronous and isochronous subactions. The operations of the respective subactions will be described below.

[Asynchronous Subaction]

Figure 20:
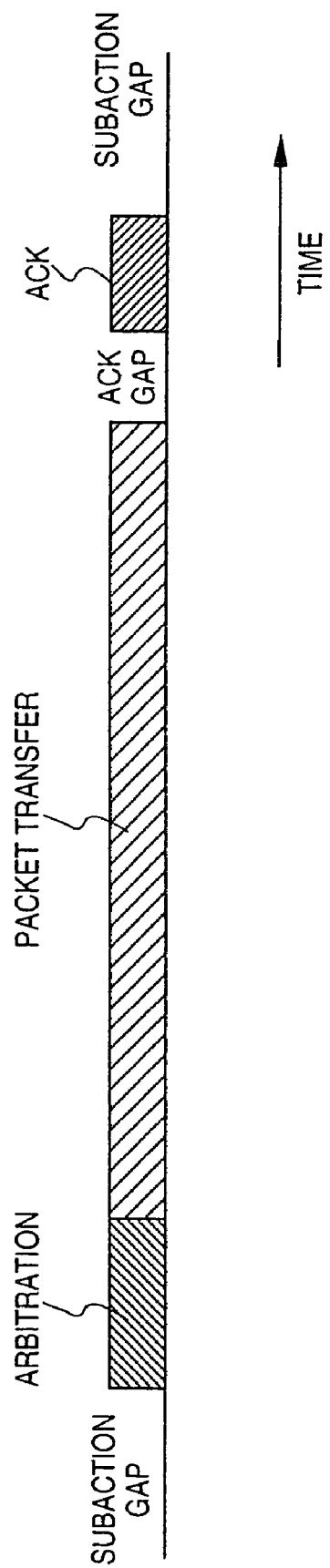
FIG. 20 is a diagram illustrating temporal transition in asynchronous transfer.

Asynchronous subaction is asynchronous data transfer. FIG. 20 is a diagram illustrating temporal transition in asynchronous transfer. An initial subaction gap in FIG. 20 indicates the idle state of the bus. At the moment idle time attains a predetermined value, a node wishing to perform data transfer requests bus access and executes bus arbitration.

When bus access is granted by bus arbitration, data is transferred in a packet format. A node that has received the data responds by sending back an acknowledge reception code "ack" or by sending a response packet, after a short gap referred to as an "ack gap". Here "ack" comprises 4-bit information and a 4-bit checksum. Further, "ack" includes information such as success, busy state, or pending state, and is sent back immediately to the node that was the data transmission source.

Figure 21:
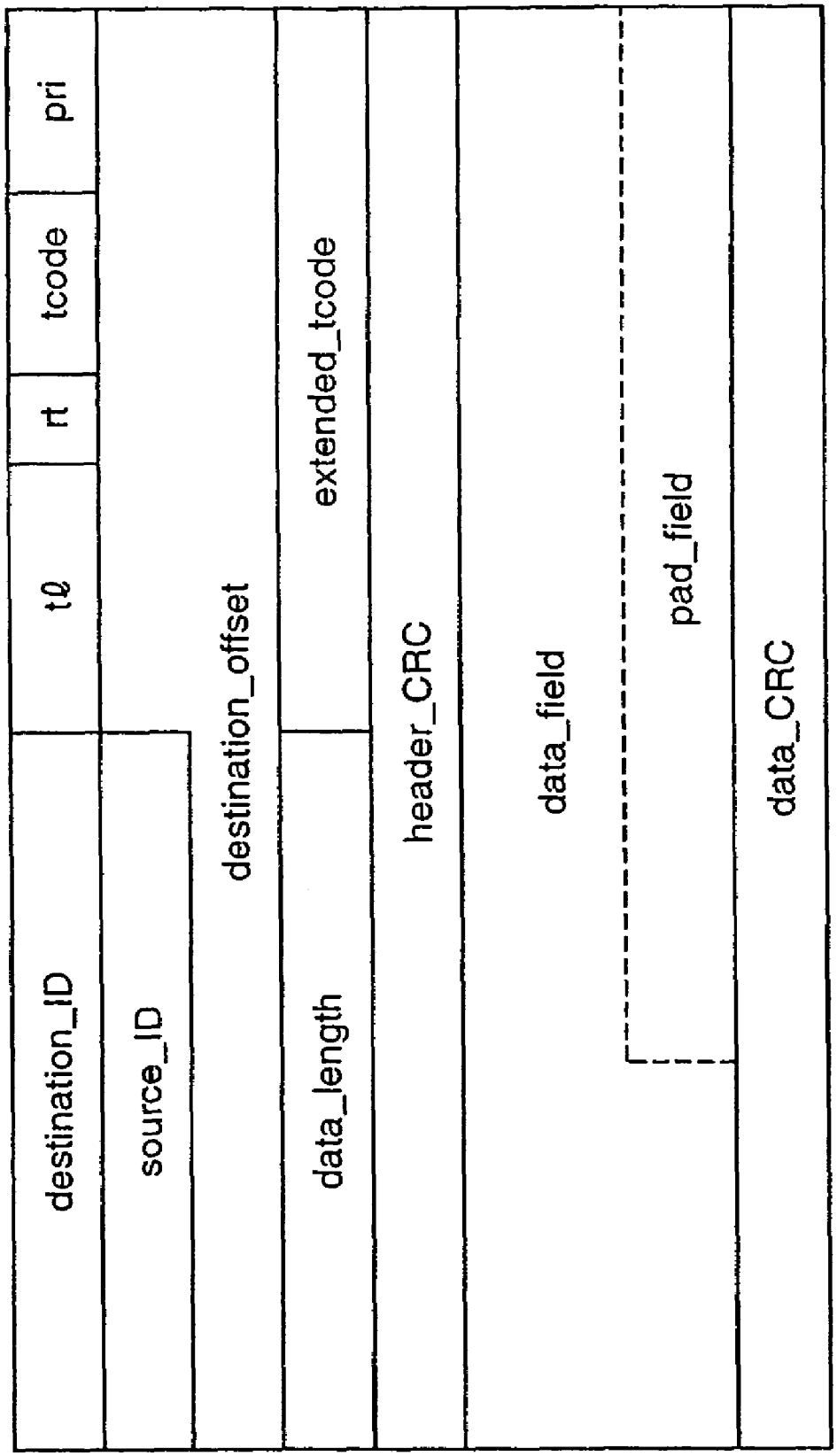
FIG. 21 is a diagram illustrating the format of an asynchronous transfer packet.

FIG. 21 is a diagram illustrating an example of the packet format for asynchronous transfer. A packet has a header portion in addition to a data field and data CRC that is for error correction. As shown in FIG. 21, a target node ID, source node ID, transfer data length, and various codes are written in the header in order to be transferred.

Asynchronous transfer is one-to-one communication from a transmission node to a reception node. A packet that has been transferred from a node that was the source of the transfer is delivered to each node in the network. However, since packets other than a node's own packet are ignored, only the node at the destination is read in.

[Split Transaction]

A service in the transaction layer 814 is carried out as a set of transaction request and transaction response shown in FIG. 18. If processing in the link layer 812 and transaction layer 814 of the target (response node) are satisfactorily high, request and response can be processed in one subaction without processing them in independent subactions of the link layer 812. However, if the processing speed of the target is low, request and response must be processed in independent transactions. This operation is referred to as a "split transaction".

Figure 22:
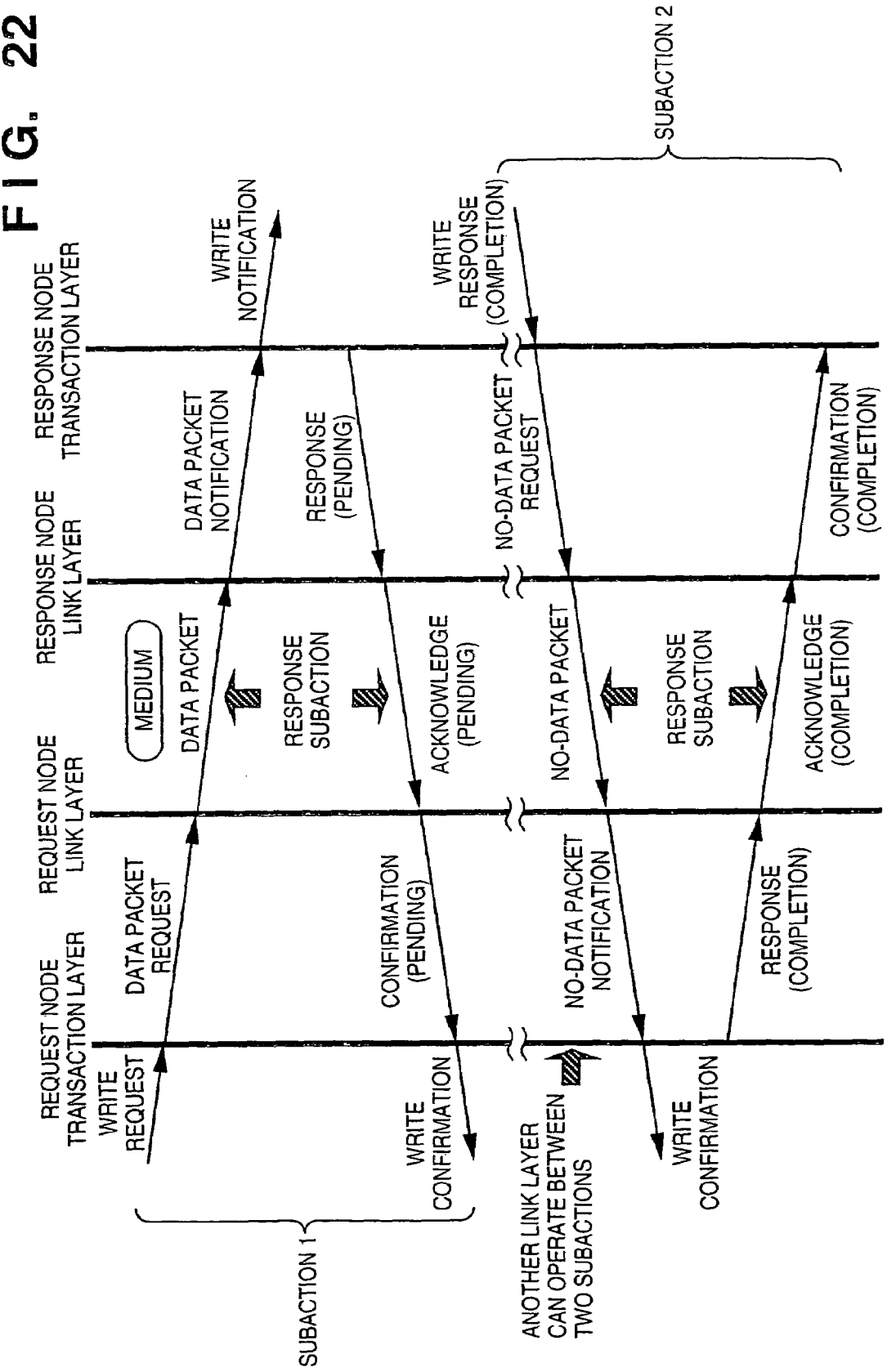
FIG. 22 is a diagram illustrating an operation of split transaction.

FIG. 22 is a diagram showing an operation of split transaction. The target sends back "pending" with respect to a write request from the controller of the initiator (request node). Then, the target can send back confirmation information with respect to the write request from the controller to ensure a data processing time. After a sufficient time has been elapsed for data processing, the target informs the controller of a write response. Then, the write transaction ends. Note that the operation of the link layer can be inserted between request and response subactions in this case.

Figure 23:
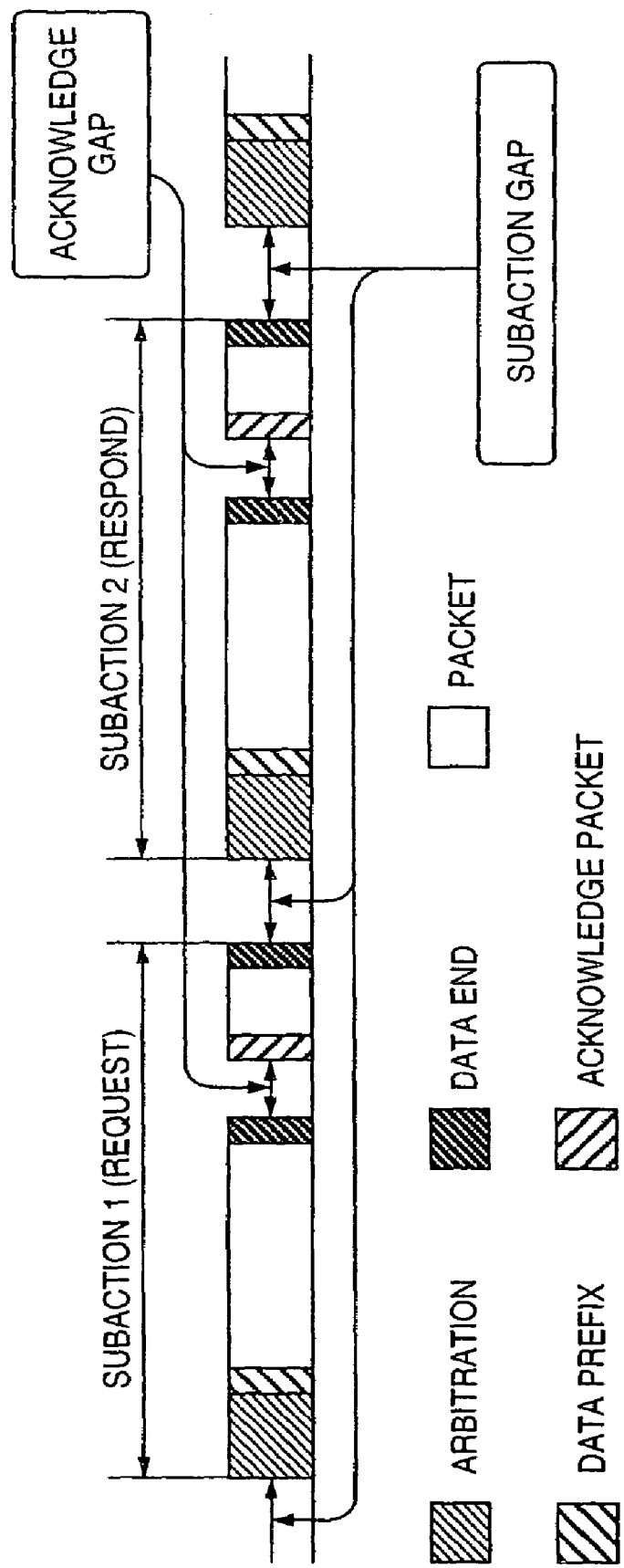
FIG. 23 is a diagram illustrating an example of temporal transition of the transfer state when split transaction is executed.

FIG. 23 is a diagram illustrating an example of temporal transition of the transfer state when split transaction is executed. Subaction 1 represents a request subaction, and subaction 2 represents a response subaction.

In subaction 1, the initiator transfers a data packet indicative of a write request to the target. The target which has received the data packet sends back "pending" indicative of confirmation information in the form of an acknowledge packet. Then, the request subaction ends.

After a subaction gap is inserted, the target sends in subaction 2 a write response indicating that the data packet does not have any data. The initiator which has received the write response sends back a completion response in the form of an acknowledge packet. Then, the response subaction ends.

The time from the completion of subaction 1 to the start of subaction 2 corresponds to a subaction gap in minimum, and can be prolonged to the maximum wait time set for the node.

[Isochronous Subaction]

Isochronous transfer, which can be said to be the most significant feature of the 1394 serial bus, is suited to the transfer of data that requires real-time transfer, such as AV data. Whereas asynchronous transfer is one-to-one transfer, isochronous transfer can uniformly transfer data from one node that is the source of the transmission to all other nodes by means of a broadcast function.

Figure 24:
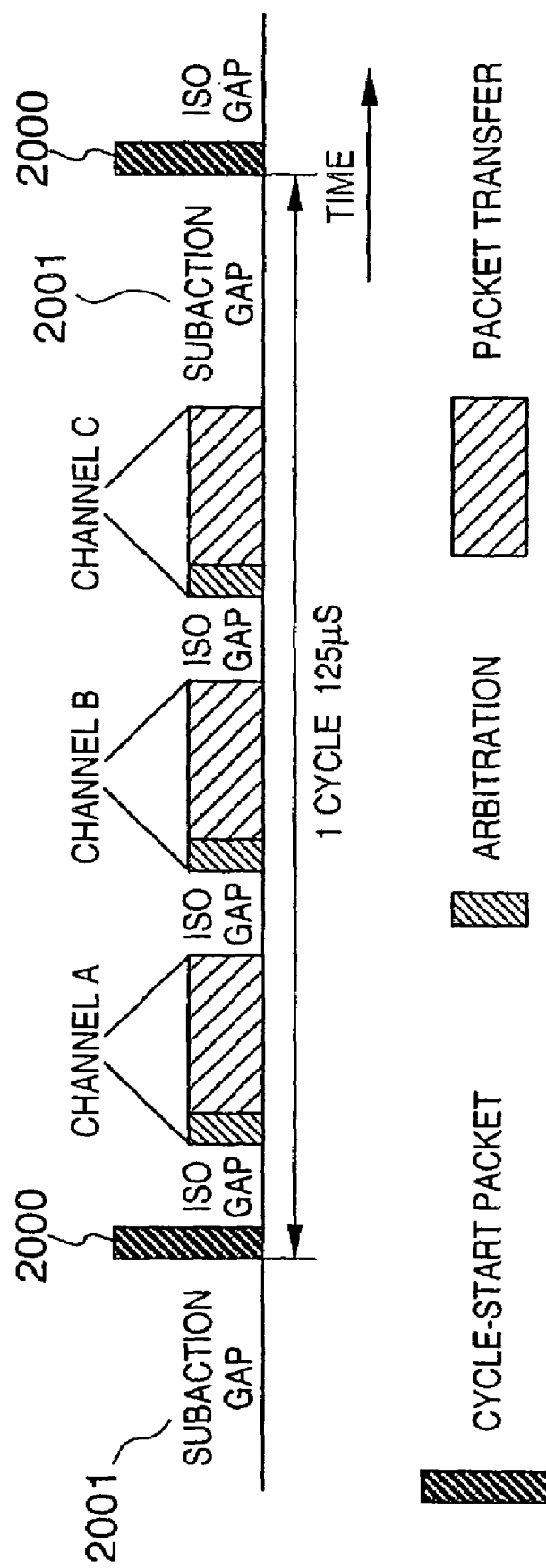
FIG. 24 is a diagram illustrating temporal transition in isochronous transfer.

FIG. 24 is a diagram illustrating temporal transition in isochronous transfer. Isochronous transfer is executed over a bus at fixed times. The time interval is referred to as an "isochronous cycle", the duration of which is 125 μs. The role of a cycle-start packet (CSP) 2000 is to indicate the start of each cycle and to synchronize the operations of respective nodes with each other. A node referred to as a "cycle master" transmits the CSP 2000. The cycle master transmits the CSP 2000, which informs of the start of the present cycle, upon elapse of a predetermined idle time (subaction gap 2001) following the end of transfer in the immediately preceding cycle. The time interval in which the CSP 2000 is transmitted is 125 μs.

A plurality of various packets can be transferred in one isochronous cycle upon being distinguished from one another by assigning channel IDs to them in the manner of channel A, channel B and channel C, as shown in FIG. 24. This makes it possible to perform-real-time transfer among a plurality of nodes substantially simultaneously. In addition, a reception node receives only the data of a desired ID channel. The channel ID does not represent the address of the reception node but merely provides a physical number in regard to data. Accordingly, a certain transmitted packet is transferred by broadcast in such a manner that the packet is delivered from the one transmission-source node to all other nodes.

As in the manner of asynchronous transfer, bus arbitration is carried out before transmission of a packet in isochronous transfer. However, since this is not one-to-one communication as in asynchronous transfer, no acknowledge reception code "ack" exists in isochronous transfer.

Further, the "iso gaps" (isochronous gaps) shown in FIG. 24 represent idle intervals necessary to confirm that the bus is idle before isochronous transfer is performed. A node that detects the predetermined idle time judges that the bus is idle. If the node wishes to perform isochronous transfer, it requests bus access. As a result, bus arbitration is executed.

Figure 25:
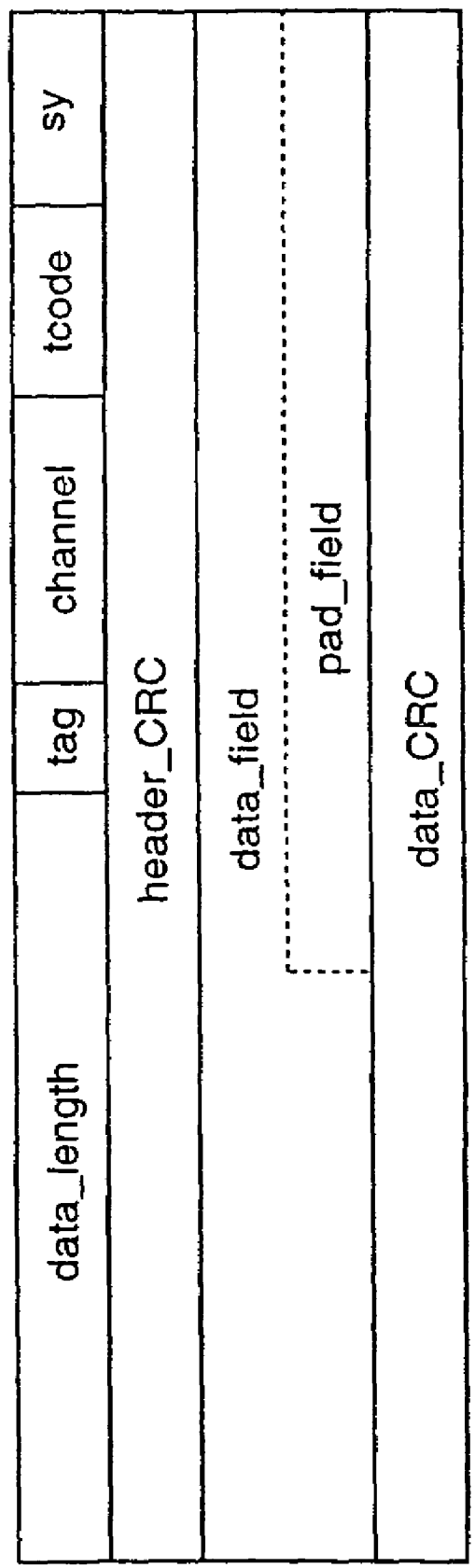
FIG. 25 is a diagram illustrating an example of the packet format for isochronous transfer.

FIG. 25 is a diagram illustrating an example of the packet format for isochronous transfer. Each of the various packets classified by their channels has a header portion in addition to a data field and data CRC that is for error correction. As shown in FIG. 26, the transfer data length, channel number, various codes, and error correction header CRC are written in the header.

[Bus Cycle]

Figure 27:
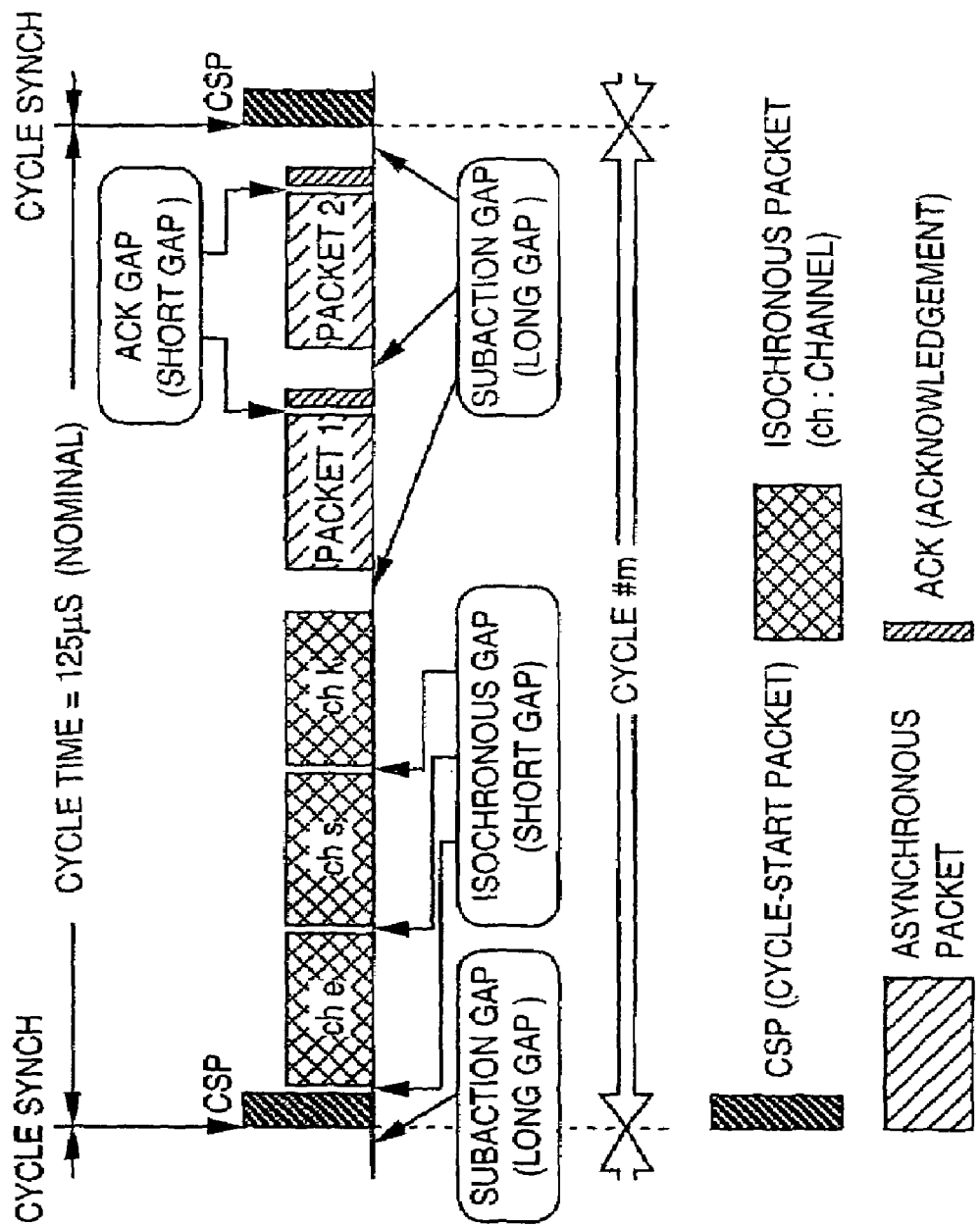
FIG. 27 is a diagram illustrating temporal transition of the transfer state when isochronous transfer and asynchronous transfer are mixed.

Transfer over an actual 1394 serial bus can be a mixture of isochronous transfer and asynchronous transfer. FIG. 27 is a diagram illustrating temporal transition of the transfer state when isochronous transfer and asynchronous transfer are mixed.

As described above, isochronous transfer is performed at a priority higher than that of asynchronous transfer. The reason for this is that after a CSP is issued, isochronous transfer can be started at a gap (isochronous gap, or "iso gap") that is shorter than the gap (subaction gap) of an idle interval necessary to start asynchronous transfer. Accordingly, priority is given to isochronous transfer over asynchronous transfer.

In the usual bus cycle shown in FIG. 27, the CSP is transferred from the cycle master to each node at the start of cycle #m. The CSP synchronizes the operations of respective nodes with each other. A node that is to perform isochronous transfer carries out bus arbitration after waiting the predetermined idle time (isochronous gap) and then enters the packet transfer phase. In FIG. 27, channel e, channel s, and channel k are transferred isochronously in the order mentioned.

After the operation from arbitration to packet transfer has been repeated a number of times equal to the number of channels given and all isochronous transfers in cycle #m end, asynchronous transfer can be carried out. That is, as a result of idle time becoming equal to the subaction gap that makes asynchronous transfer possible, a node that desires to perform an asynchronous transfer carries out bus arbitration. However, asynchronous transfer can be made only in a case where the subaction gap for activating asynchronous transfer is detected in a period of time from the end of isochronous transfer to the moment (cycle synch) at which the next CSP is to be transferred.

In the cycle #m in FIG. 27, asynchronous transfer after isochronous transfer of three channels transfers two packets (packet 1 and packet 2) including "ack". Following asynchronous packet 2, the time (cycle synch) at which cycle #m+1 is to start arrives. As a result, transfer in cycle #m ends at this point. However, if the time (cycle synch) at which the next CSP is to be transmitted has arrived during asynchronous or isochronous transfer, the transfer is not forcibly interrupted and the CSP of the next cycle is transmitted after waiting the idle time that follows the end of transfer. In other words, when one isochronous cycle continues for 125 μs or more, the next isochronous cycle is made correspondingly shorter than the standard 125 μs. That is, the isochronous cycle can be made longer or shorter than the reference 125 μs.

If necessary, isochronous transfer is executed every cycle in order to maintain real-time transfer. As a result of cycle time being shortened, there are also occasions where asynchronous transfer is held over to the-ensuing cycle. Such delay information also is managed by the cycle master.

<Device Map>

The IEEE 1394 standard provides the following means as a means for allowing an application to recognize a 1394 network topology in order to create a device map. Note that the topology represents the connection statuses of respective nodes connected to a bus, and is information indicative of the connection status of nodes shown in FIG. 1.

1. Topology map information held in the bus manager is read.

2. The topology is estimated from a self ID packet in bus reset.

However, means 1 and 2 can obtain the topology of the cable connection order based upon the child-parent relationship between nodes, but cannot obtain information indicative of the physical positional relationship of nodes (but undesirably obtain information about a port which is not actually mounted).

As another means, information for creating a device map is held in the database of a device other than the configuration ROM. In this case, the means for obtaining various pieces of information depends on protocols for database access, data transfer, and the like.

The configuration ROM itself and the function of reading it are necessarily attached to an IEEE 1394-compliant device. Thus, the device is equipped with a function of storing information about the device position, function, and the like in the configuration ROM of each node and reading information by an application. This allows the application of each node to have a so-called device map display function regardless of specific protocols for database access, data transfer, and the like.

The configuration ROM can store a physical position, function, and the like as node unique information. Such information can be used to realize the device map display function.

In this case, in order for the application to obtain the 1394 network topology based upon the physical positional relationship, the configuration ROM of each node is read in accordance with bus reset or user's request to obtain the 1394 network topology. Alternatively, various pieces of node information such as the function in addition to the physical position of the node may be described in the configuration ROM. By reading the configuration ROM, function information of each node can be attained at the same time as the physical position of the node. When the application is to acquire configuration ROM information of each node, the application uses an API for acquiring arbitrary configuration ROM information of a designated node.

Using this means, the application of a device on the IEEE 1394 network can create various device maps such as a physical topology map and the function map of each node in accordance with application purposes. Further, the user can select a device having a necessary function.

First Embodiment

An ink-jet printer as a 1394 device in the first embodiment will be described mainly for the arrangement of a 1394 serial bus interface.

Figure 28:
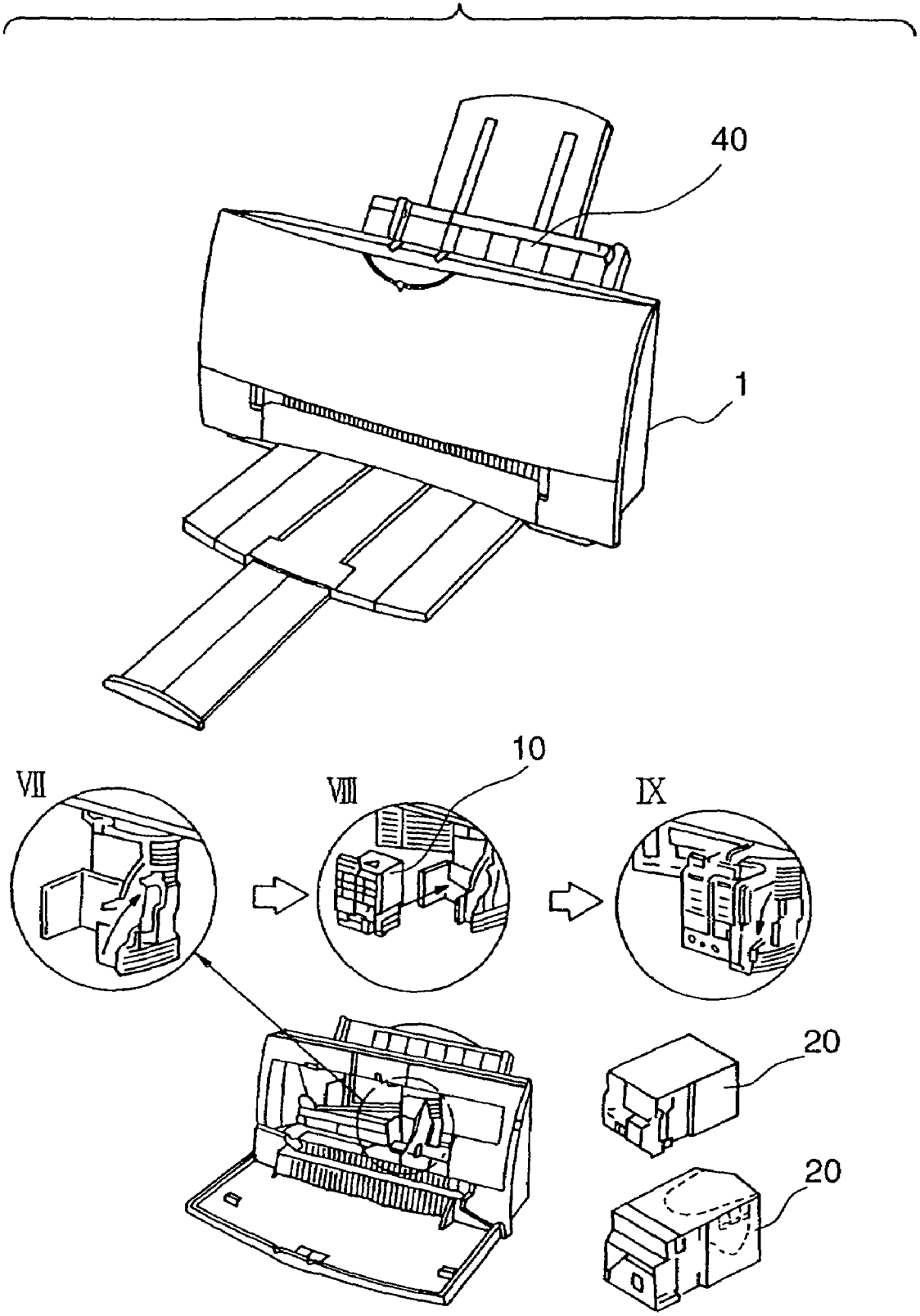
FIG. 28 is a view illustrating the structure of an ink-jet printer according to the first embodiment.

FIG. 28 illustrates an ink-jet printer as a device having a 1394 interface. Print heads 10 and 20 can be dismounted from the device, and a scanner head unit 30 can be mounted as an option. Hence, the printer can additionally have a scanner function.

When the print head is mounted, an ink cartridge can be exchanged. A color ink-jet cartridge (CIJC) 10 storing a color ink and a monochrome ink-jet cartridge (MIJC) 20 storing only a black ink are prepared.

The printer can be equipped with an automatic sheet feeder 40 capable of automatically feeding a plurality of sheets. In discharging a sheet being printed, i.e., sheet on the platen, the automatic sheet feeder 40 guides a next sheet to the sheet insertion port of the printer. If the printer senses the sheet by a paper sensor at the sheet insertion port after discharge, the automatic sheet feeder 40 feeds a next sheet so as to set it on the platen. The paper tray of the automatic sheet feeder 40 has a remaining sheet sensor. When the number of sheets set in the sheet feeder becomes lower than a predetermined number, the sensor reacts.

There are prepared two types of automatic sheet feeders mountable on the printer, which are selectively used in accordance with a feedable sheet size. An automatic sheet feeder ASF-A4 is used to feed A4-size sheets, whereas an automatic sheet feeder ASF-A3 is used to feed A3-size sheets.

Figure 29:
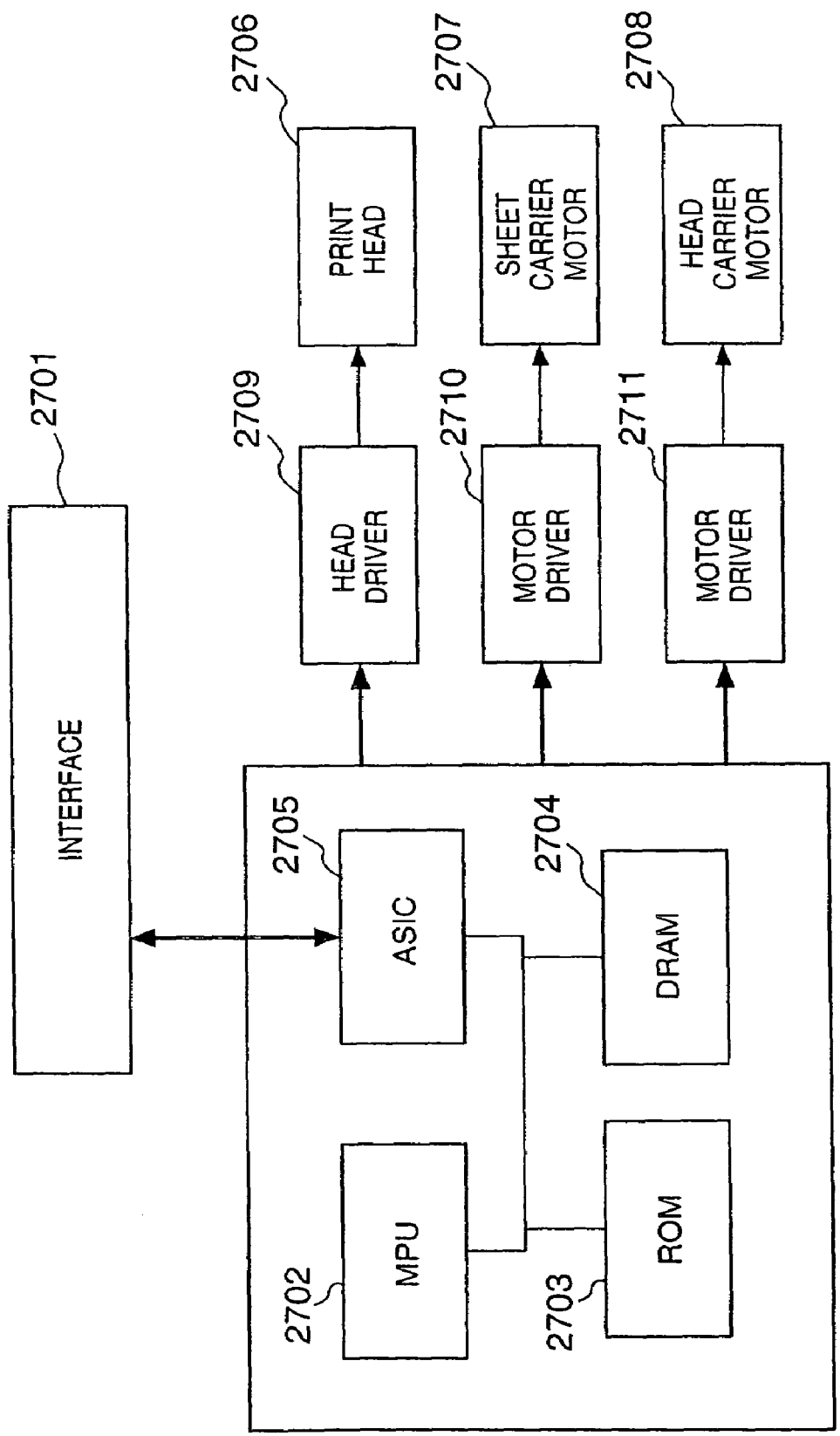
FIG. 29 is a block diagram illustrating the system arrangement of the ink-jet printer according to the first embodiment.

FIG. 29 is a block diagram useful in describing the system of the ink-jet printer.

In FIG. 29, reference numeral 2701 denotes an interface for inputting a printing signal from a host computer; 2702, an MPU; 2703, a ROM which stores control programs and host printing information executed by the MPU 2702; 2704, a RAM for storing various data (printing signal, printing data supplied to the head, and the like); and 2705, a gate array for controlling supply of output data to a print head 2706 and controlling data transfer between the interface 2701, MPU 2702, and RAM 2704.

The print head 2706 is shown in FIG. 28. Reference numeral 2707 denotes a sheet carrier motor for conveying a printing sheet; 2708, a head carrier motor for conveying the print head 2706; 2709, a head driver for driving the print head; 2710, a motor driver for driving the carrier motor 2707; and 2711, a motor driver for driving the carrier motor 2707.

The ink-jet printer is connected to a device using an IEEE 1394 serial bus. A block serving as a 1394 serial bus interface (to be referred to as a 1394 I/F block hereinafter) is the interface 2701 in FIG. 29.

Figure 30:
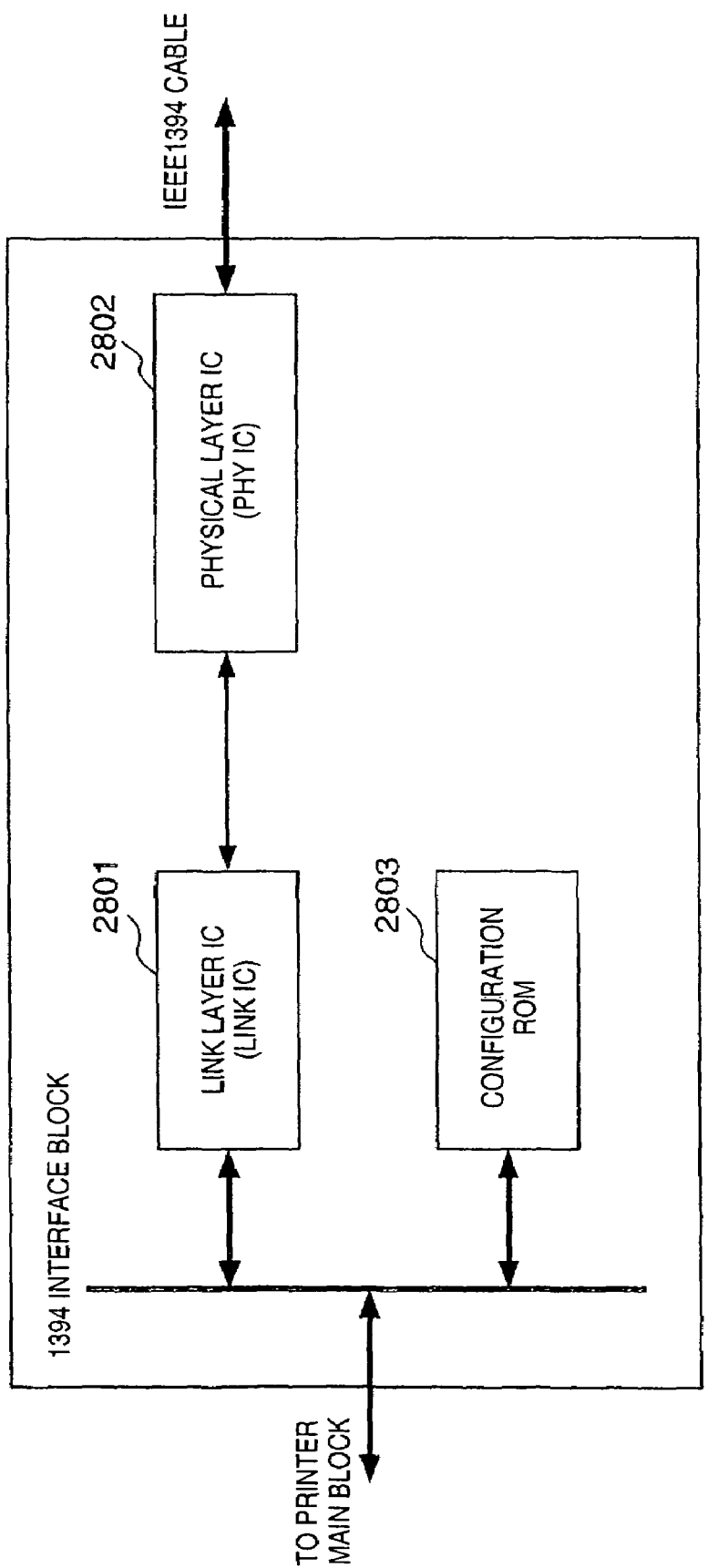
FIG. 30 is a block diagram illustrating the arrangement of the 1394 interface block of the ink-jet printer according to the first embodiment.

The arrangement of the 1394 I/F block will be explained. FIG. 30 is a block diagram illustrating the basic arrangement of the 1394 I/F block. The arrangement shown in FIG. 30 is part of the interface 2701.

In FIG. 30, reference numeral 2802 denotes a physical layer control IC (PHY IC) which directly drives the 1394 serial bus and realizes the physical layer function in <Overview of IEEE-1394>. The main functions of PHY IC are bus initialization, arbitration, encoding/decoding of a transmission data code, monitoring of a cable ON state, supply of a load termination type power source (for recognizing active connection), and an interface with a link layer IC.

Reference numeral 2801 denotes a link layer control IC (LINK IC) which interfaces the printer main body, controls data transfer of PHY IC, and realizes a link layer function in <Overview of IEEE-1394>. The main functions of this IC are a transmission/reception FIFO function for temporarily storing transmission/reception data via the PHY IC 2802, a function of packeting transmission data, a function of determining whether the PHY IC 2802 is suitable for an assigned channel when reception data has an own node address or is isochronous transfer data, a receiver function of performing error check for the data, and a function of interfacing the printer main body.

In FIG. 30, reference numeral 2803 denotes a configuration ROM that stores identification and communication conditions unique to each device. The data format of this ROM complies with the format defined by the IEEE 1212 and IEEE 1394 standards, as described in <Overview of IEEE-1394>.

The ink-jet printer of the first embodiment has a configuration ROM like the one shown in FIG. 29, This format complies with the format shown in FIG. 14.

Software unit information of each device is stored in Unit directories, and node unique information is stored in a Node dependent info directory.

Basic functions such as a printer function and scanner function that are supported by each device with the current arrangement, or detailed information accessory to the basic functions can be stored in a Instance Directory that is a subdirectory offset from the Root Directory.

The structure of the Instance Directory will be described. The Instance Directory stores basic function information supported by the device on the basis of the device function category regardless of protocols classified in advance. For a device that supports a single function, one basic function information is stored. For a device that supports a plurality of functions, these functions are listed.

Each of the listed functions includes a corresponding Function Set Directory. The Function Set Directory stores pointer information to a Unit directory which stores software information corresponding to each function. Further, the Function Set Directory stores a pointer to a Feature Directory for storing detailed unique information about each function.

Figure 32:
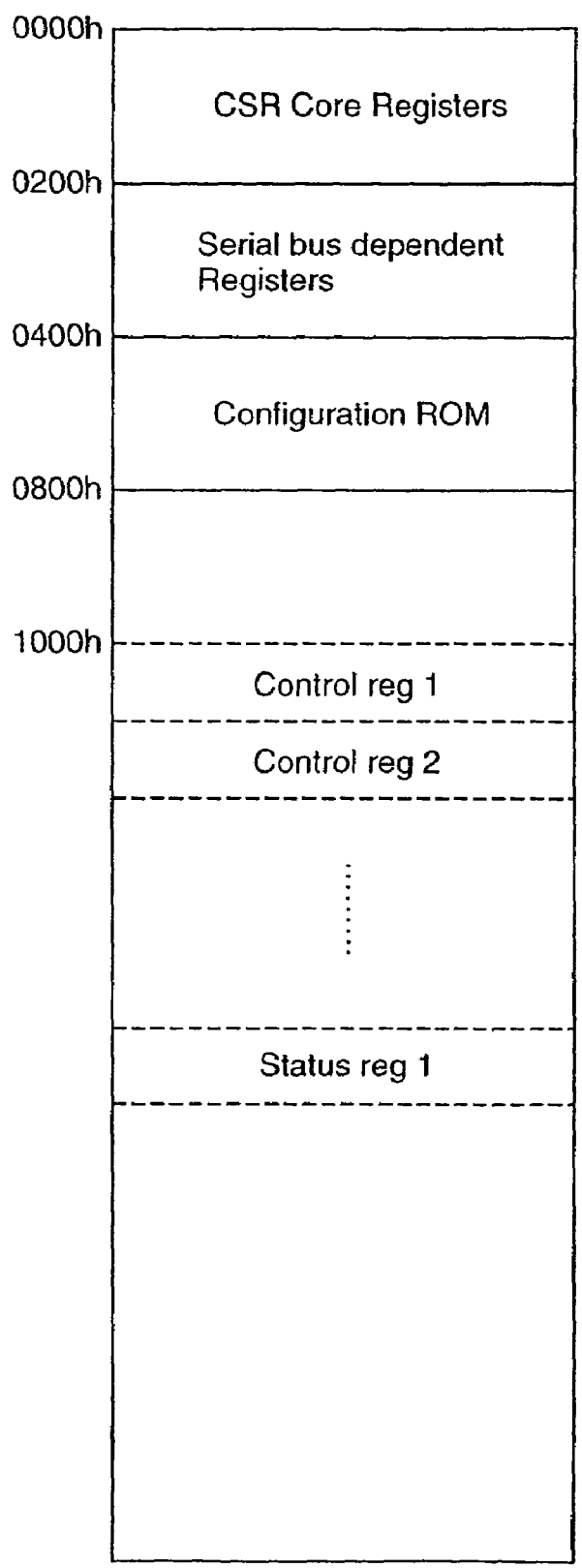
FIG. 32 is a diagram illustrating the address space of the ink-jet printer according to the first embodiment.

As described in <Overview of IEEE-1394>, the last 28 bits out of the address setting of the 1394 serial bus are ensured as the unique data area of each device which can be accessed by another device connected to the serial bus. FIG. 32 is a diagram illustrating the memory map of the unique data area (28-bit address space) in the ink-jet printer according to the first embodiment. The above-described configuration ROM is set in an area from address 400$h$ to address 800$h$ in FIG. 32.

Registers concerning the unique operation of the printer main body are set in an area after address 800$h$. These registers are physically printer controllers and are set in the ASIC in FIG. 29.

Status registers that can monitor the operation status of the printer or control registers that can control the operation status are set in an area after address 1000$h$. FIG. 32 illustrates some of these registers (status registers and control registers).

A state in which the ink-jet printer having the above arrangement is connected to a host personal computer via an IEEE 1394 bus will be described. Assume that the print head and color ink-jet cartridge are set in the ink-jet printer, and the automatic sheet feeder ASF-A3 capable of feeding A3-size sheets is mounted.

After the two devices are connected, both the computer and personal computer are turned on. Then, bus reset occurs owing to IEEE 1394 characteristics.

In order to automatically assign a node ID in response to bus reset, the two devices start a bus-reset sequence and node-ID decision sequence. Details of these sequences have been described in [Bus-reset sequence] and [Node-ID decision sequence] of <Overview of IEEE-1394>.

Assignment of a node ID is decided through these sequences, and the 1394 bus initialization routine ends. In this case, assume that the personal computer becomes a root node.

After that, the personal computer reads the configuration ROM of a partner node to a connected node at a timing at which information about the connected printer is wanted to be obtained (e.g., when the user requests information about the device connected via the 1394 bus). This state is shown in FIG. 18. More specifically, the personal computer uses read transaction of the IEEE 1394 bus with respect to the partner node, and receives the contents of the ROM of the partner node as the read response.

Figure 33:
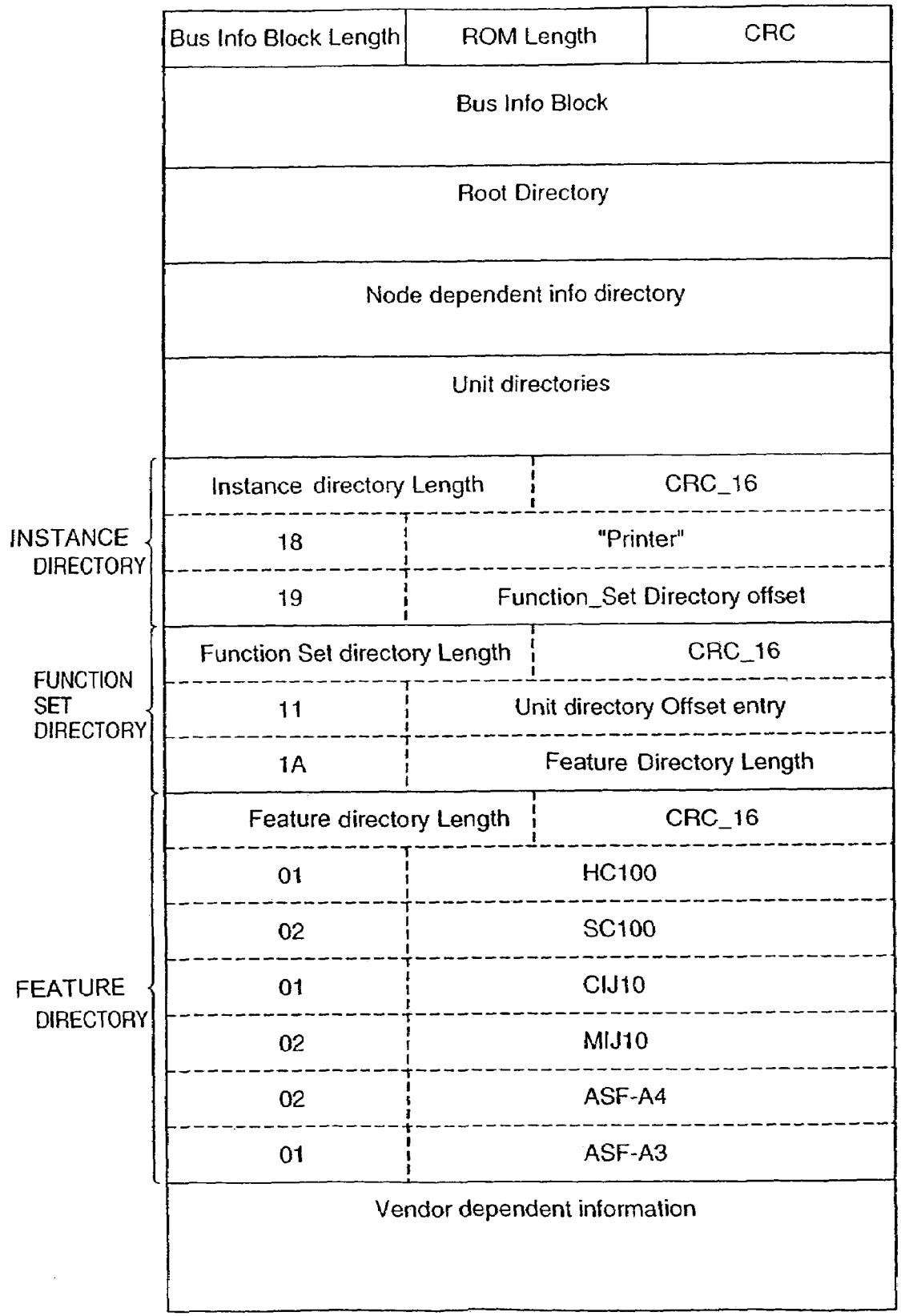
FIG. 33 is a diagram illustrating details of the Instance Directory of the storage data in the configuration ROM of the ink-jet printer according to the first embodiment.

As described above, the ROM of the printer stores the Instance Directory, Function Set Directory, and Feature Directory. FIG. 33 illustrates a data structure of the configuration ROM of the ink-jet printer according to the first embodiment.

The computer first reads out basic information about a minimum bus necessary for communication that is stored in the Root Directory. Then, the computer reads out information about the manufacturer name and model name of the device. If the computer finds a Instance Directory during read of the ROM, the computer reads out the contents. In the first embodiment, this Instance Directory stores basic function category information of the device together with a corresponding keyvalue "99". As for the ink-jet printer of the first embodiment, a value "Printer" meaning a printer is stored as basic function information. The computer reads this information to recognize that the connected device is a printer.

The Instance Directory also stores pointer information to the Unit directory for storing software information necessary to access the printer function, and stores a pointer to the Feature Directory for storing detailed unique information about each function. The computer reads out these pieces of information to obtain outline information of the device according to the first embodiment as a connected 1394 device.

In the Feature Directory, pieces of information about optional devices which can be bought and mounted on the printer are listed up in accordance with a keyvalue for specifying the type of information and a predetermined format. More specifically, the Feature Directory stores information about a color ink-jet cartridge CIJ10 storing a color ink that is an ink cartridge mountable together with a print head HC100, information about a monochrome ink-jet cartridge MIJ10 storing only a black ink, information about an SC100 as an optional scanner head unit, information about the automatic sheet feeder ASF-A4 for feeding A4-size sheets, and information about the automatic sheet feeder ASF-A3 for feeding A3-size sheets. As for each optional device, the device name and brief description are stored as data.

In addition to the above information, this Feature Directory stores information data of a currently mounted optional device among listed-up optional devices, together with a keyvalue for specifying the optional device.

In this ink-jet printer, as shown in FIG. 33, information data indicative of the print head HC100, cartridges CIJ10 and MIJ10, scanner head SC100, and automatic sheet feeders ASF-A4 and ASF-A3 are listed up together with key values "01" and "02" indicative of optional device information. (Note that optional device information of the "ROM" is rewritten in accordance with an option mounted on the printer. The configuration ROM in the IEEE 1394 interface, i.e., the ROM in the first embodiment actually uses an erasable memory. This allows dynamically rewriting optional device information.) In this case, "01" represents an optional device currently mounted on the printer main body. In FIG. 33, the keyvalues of data representing the currently mounted print head HC100, color ink-jet cartridge CIJ10, and automatic sheet feeder ASF-A3 are set to "01".

Subsequent to the Instance Directory, the computer connected in the above-mentioned manner can read the Feature Directory to read out information about optional devices mountable on the ink-jet printer and information about currently mounted optional devices.

As an application on the host computer, the host computer uses a device connection information (device map) application for displaying, on the personal computer, the connection status and device information of a (plurality of) device(s) connected to the computer via the IEEE 1394 bus, and managing and controlling devices.

In the first embodiment, the device map is displayed using the device connection information (device map) display program of displaying the connection status and device information of 1394 devices connected to the computer. Then, information about devices connected to the personal computer is read out from the configuration ROM of each connected device in accordance with the request of the program.

In the first embodiment, the connected ink-jet printer is detected, and its configuration ROM is read. At this time, the above-described information about optional devices can also be read out to create a mounted-device table for the ink-jet printer based upon the Feature Directory shown in FIG. 33. On the basis of this information, the program displays, on the display, optional devices mounted on the printer in addition to printer information about the manufacturer, model name, and function. Further, the program displays mountable optional devices.

Figure 34:
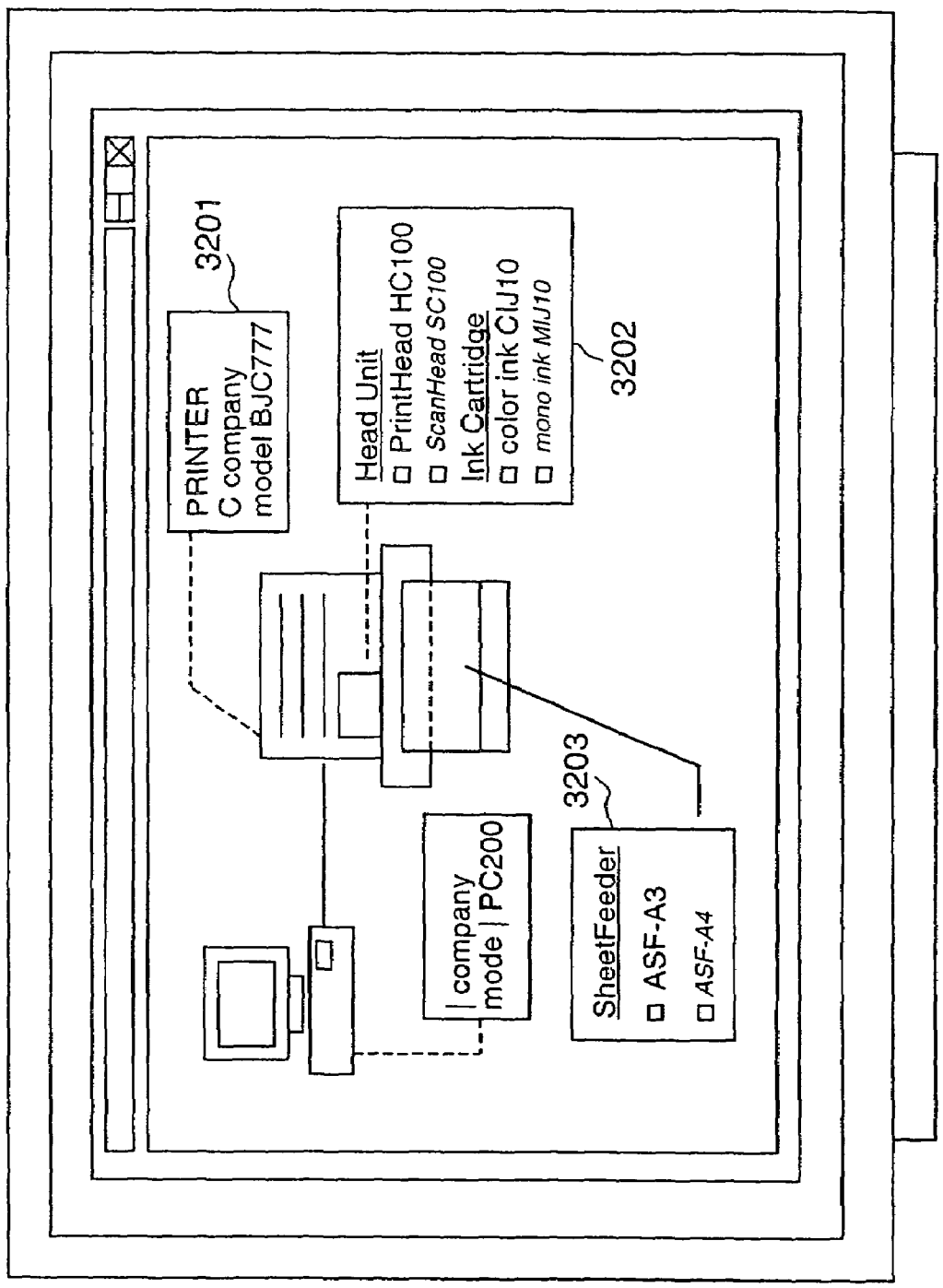
FIG. 34 is a view illustrating a display of a device map according to the first embodiment.

FIG. 34 is a view illustrating a display of device information according to the first embodiment. In this display, device information is displayed as an icon together with character information. The device detected to be a printer from data of the Instance Directory is displayed as a printer icon. Various optional devices are also displayed as corresponding icons.

Figure 35:
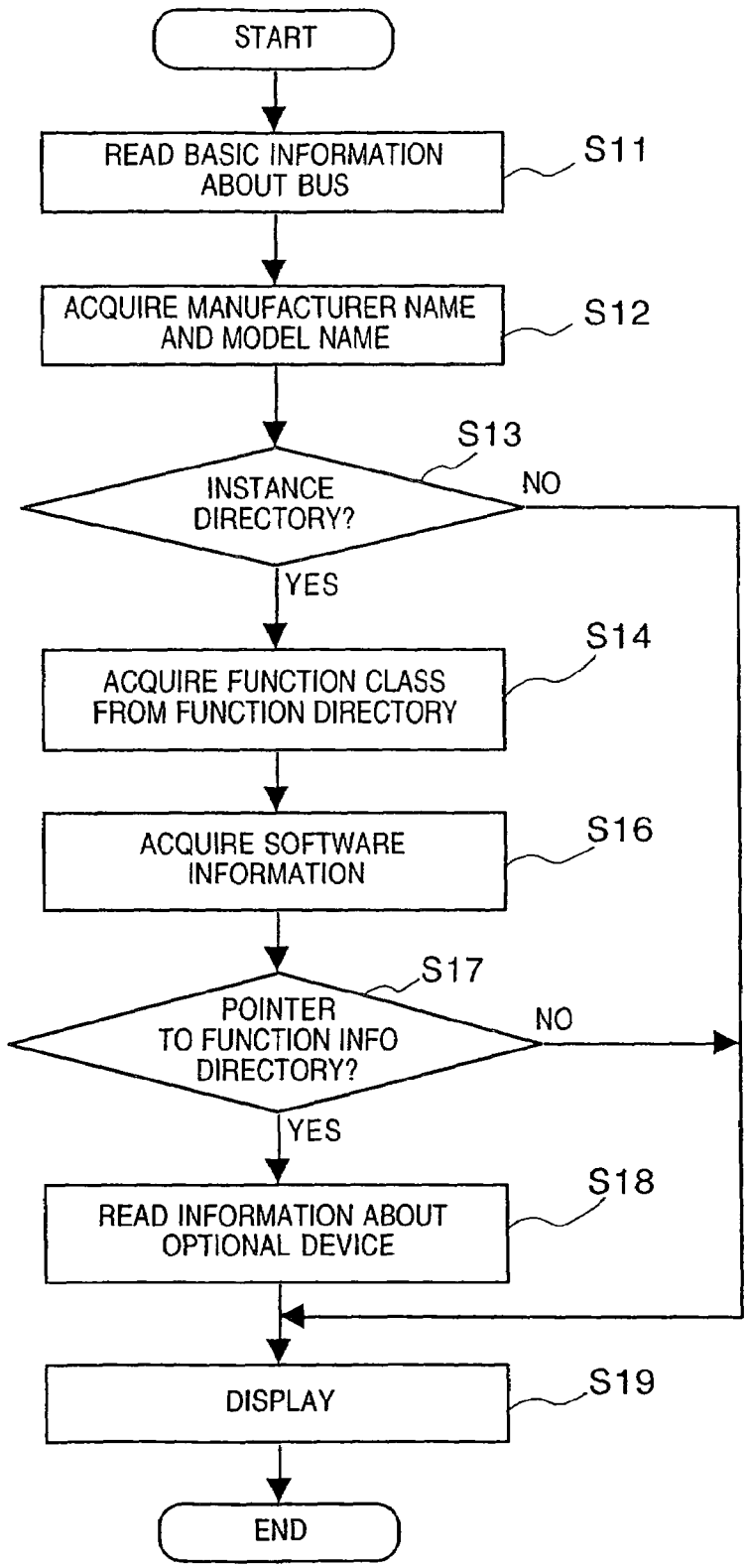
FIG. 35 is a flowchart useful in describing a device map display sequence according to the first embodiment.

The above processing is shown in the flowchart of FIG. 35. FIG. 35 is a flowchart useful in describing a printer information acquisition sequence according to the first embodiment. At step S11, the computer reads out basic information about a minimum bus necessary for communication that is stored in the Root Directory. At step S12, the computer reads out information about the manufacturer name and model name of the printer.

If a Instance Directory is found during read of the configuration ROM, processing proceeds from step S13 to step S14 to obtain a function class ("printer" in the example of FIG. 33).

At step S16, the computer obtains software information from the Function Set Directory.

If the Function Set Directory stores an offset value to the Feature Directory, processing proceeds from step S17 to step S18. At step S18, the computer reads out information indicative of optional devices mountable on the printer that is stored in the Feature Directory. At step S19, the computer displays the pieces of information obtained at the respective steps.

Figure 31:
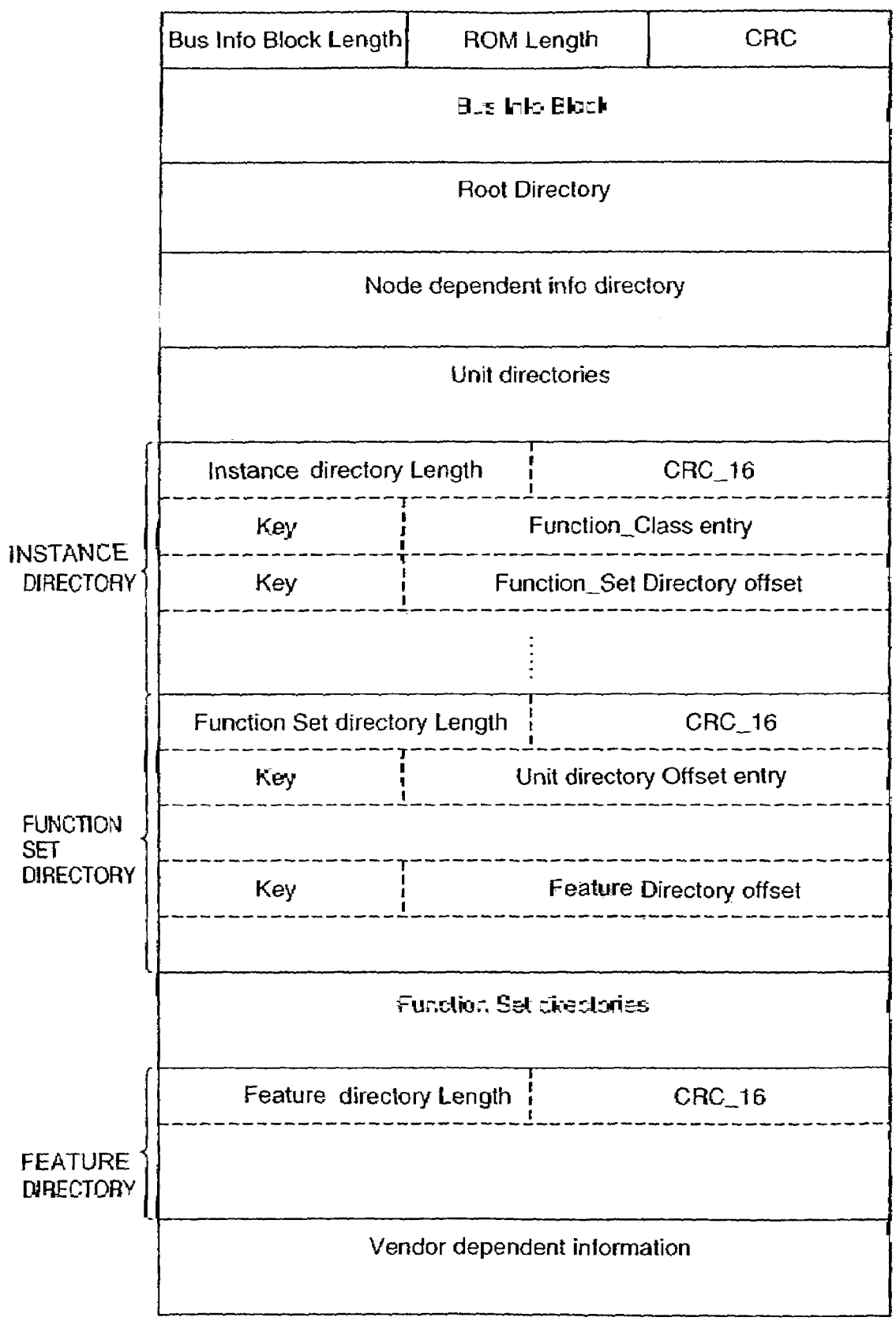
FIG. 31 is a diagram illustrating the format of storage data in the configuration ROM according to the first embodiment.

For each optional device, the Feature Directory stores a keyvalue representing that the device has already been mounted or a keyvalue representing that the device is not mounted. On the display at step S19, a mounted optional device is displayed with a bold character, and an optional device not mounted is displayed with a smaller italic character, as shown by blocks 3202 and 3203 in FIG. 34. The block 3201 displays the manufacturer name, model name, and function class of the printer read at steps S12 and S14. In the data structures shown in FIGS. 31 and 33, the Instance Directory, Function Set Directory, and Feature Directory are blocks expanded in addition to blocks (Bus Info Block, Root Directory, and the like) standardized on the ROM in order to realize this embodiment. As described above, the Instance Directory describes a device name "printer". The Function Set Directory associates the device "printer" with corresponding software and further with the Feature Directory describing detailed information about the "printer device". The Instance Directory describes an optional device candidate to be mounted on the device "printer", and mounting/non-mounting information (using a keyvalue).

According to the first embodiment, information unique to a device is stored in a predetermined read-only memory area in the device. At the same time, information about mountable optional devices and information about optional devices that have already been mounted are stored as an additional function. Based upon these pieces of information, information about optional devices that have already been mounted is provided as part of the device arrangement, and information about optional devices that are not mounted is provided as non-mounted device information. Thus, the user can easily grasp option information of the device.

A standard communication controller can obtain option information of each device, so that no database and the like are required. Since the standard communication controller can obtain option information, option information of a partner device can be obtained even when host protocols are not compatible. This enhances the effects particularly in obtaining information in a network connected to many devices having different upper protocols and communication software applications.

As described above, according to the present invention, the user can easily grasp information about devices mountable on an apparatus.

Second Embodiment

In the second embodiment, function information is written in the configuration ROM of each device in a network such as an IEEE 1394 network. Various applications for displaying topologies and functions realize their services using the function information of the configuration ROM.

Figure 36:
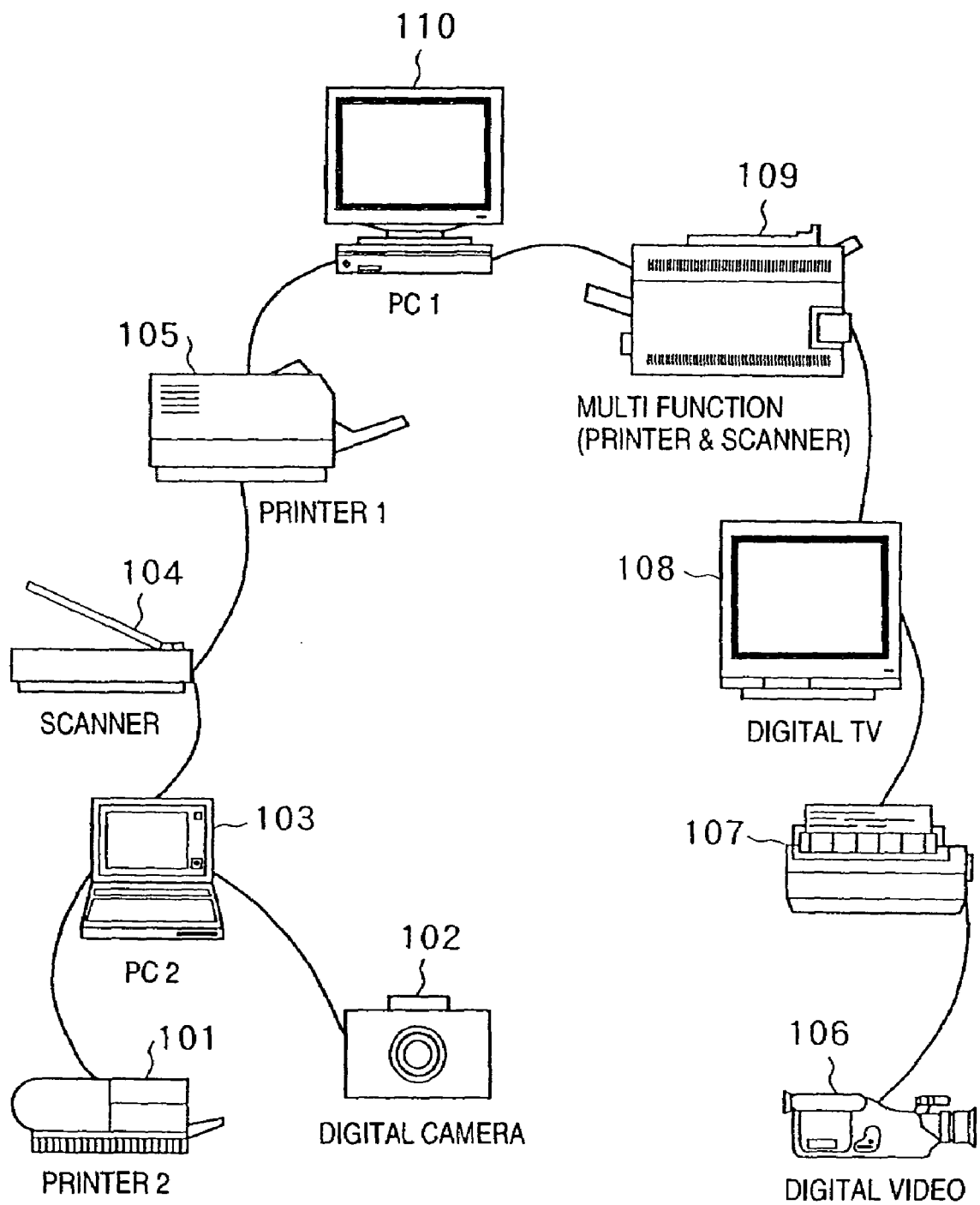
FIG. 36 is a view illustrating a general arrangement of a system to which the second embodiment is applied.

FIG. 36 is a view illustrating an IEEE 1394 network in the second embodiment. All the devices in FIG. 36 comply with the IEEE 1394 standard, and connected to each other, as shown in FIG. 36. Reference numeral 101 denotes a laser beam printer 101 (Printer2) having a resolution of 720 dpi and an output ability of 1.5 sheets/min; 102, a digital camera (Digital Camera) capable of processing an XG-size image; 103, a personal computer (PC); 104, a scanner (Scanner) having a resolution of 1,200 dpi and an image input ability of 0.5 sheets/min; 105, a laser beam printer (Printer1) having a resolution of 720 dpi and an output ability of 1.5 sheets/min; 106, a digital video (Digital Video); 107, a color ink-jet printer (Printer3) having a resolution of 360 dpi and an output ability of 0.5 sheets/min; 108, a digital television (Digital TV); 109, a multi function device (Multi Function Device) having a printer function with a resolution of 1,200 dpi and an output ability of 2.0 sheets/min and a scanner function with a resolution of 1,200 dpi and an image input ability of 2.0 sheets/min; and 110, a computer (PC 1).

In the network of FIG. 36, an application for displaying topologies and functions exists in the PC1. However, the read transaction of the IEEE 1394 network is adopted for the function of reading the configuration ROM of this application. Hence, the application can be installed in a device other than the PC1 by changing the device-dependent display function.

Figure 37:
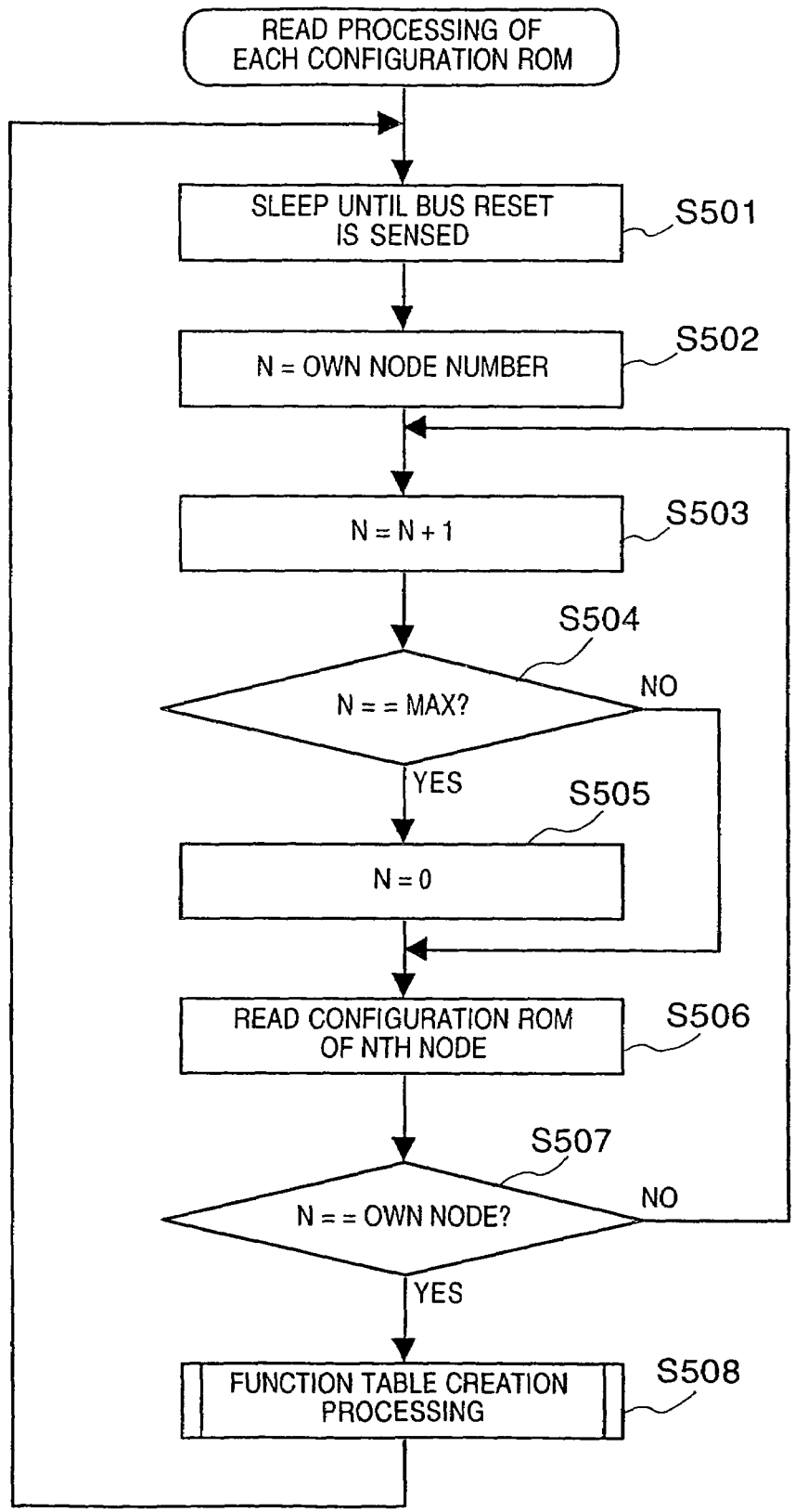
FIG. 37 is a flowchart illustrating details of configuration ROM read processing according to the second embodiment.

FIG. 37 is a flowchart illustrating the display application of the IEEE 1394 network device. This application can read out configuration ROM information from each node of an IEEE 1394 network to which the application currently belongs, create a function table from the read information, and display a function realized using not only topologies but also a plurality of devices.

The application carries out processing at the start of the application or when it senses bus reset. Until the application senses bus reset, it keeps a sleep state (step S501). At the start of the application or when bus reset occurs, the application stores its own node ID as a variable N (step S502), and increments N by one (step S503). The application compares N with the total number of nodes. If N is equal to or larger than the total number of nodes, the application sets "0" in N (steps S504 and S505). If N is equal to or smaller than the total number of nodes, the application reads the ID and the configuration ROM of the Nth node (steps S504 and S506). In this manner, the application reads configuration ROMs from a node next to the own node. At time when the application reads its own configuration ROM (step S507), the application has read the configuration ROMs of all the nodes in the system. Then, the application creates a function classification table (step S508).

FIGS. 38A and 38B are tables each illustrating a device function classification table created by extracting information necessary for target function classification from the configuration ROMs of respective devices that are read by processing shown in FIG. 37. In particular, the second embodiment exemplifies image input/output function information, image processing function information, image input/output speed information, and image input/output quality information as function category classification information described in the configuration ROM. FIG. 38A illustrates input-side function information, and FIG. 38B illustrates output-side function information.

From these function category tables, the application program can determine what function can be realized by combining respective devices currently present on the IEEE 1394 network. The function can determine what combination of devices exhibits the maximum performance.

For example, a copying function can be realized by combining Scanner in FIG. 38A, and Printer1, Printer2, and Multi Function Device in FIG. 38B. Note that functions obtained by combining a plurality of devices such as a copying function by the scanner and printer and a capturing function by the digital video and digital television are defined by the application in advance.

A combination of devices that exhibits the maximum performance can be estimated from the parameters Speed and Quality in FIGS. 38A and 38B.

FIGS. 39 to 44 are views useful in describing an operation of the application program for displaying topologies and functions based upon configuration ROM information of each device that is realized on the PC1. Detection of functions realized by a combination of devices and display of the ability using the application will be explained.

Figure 39:
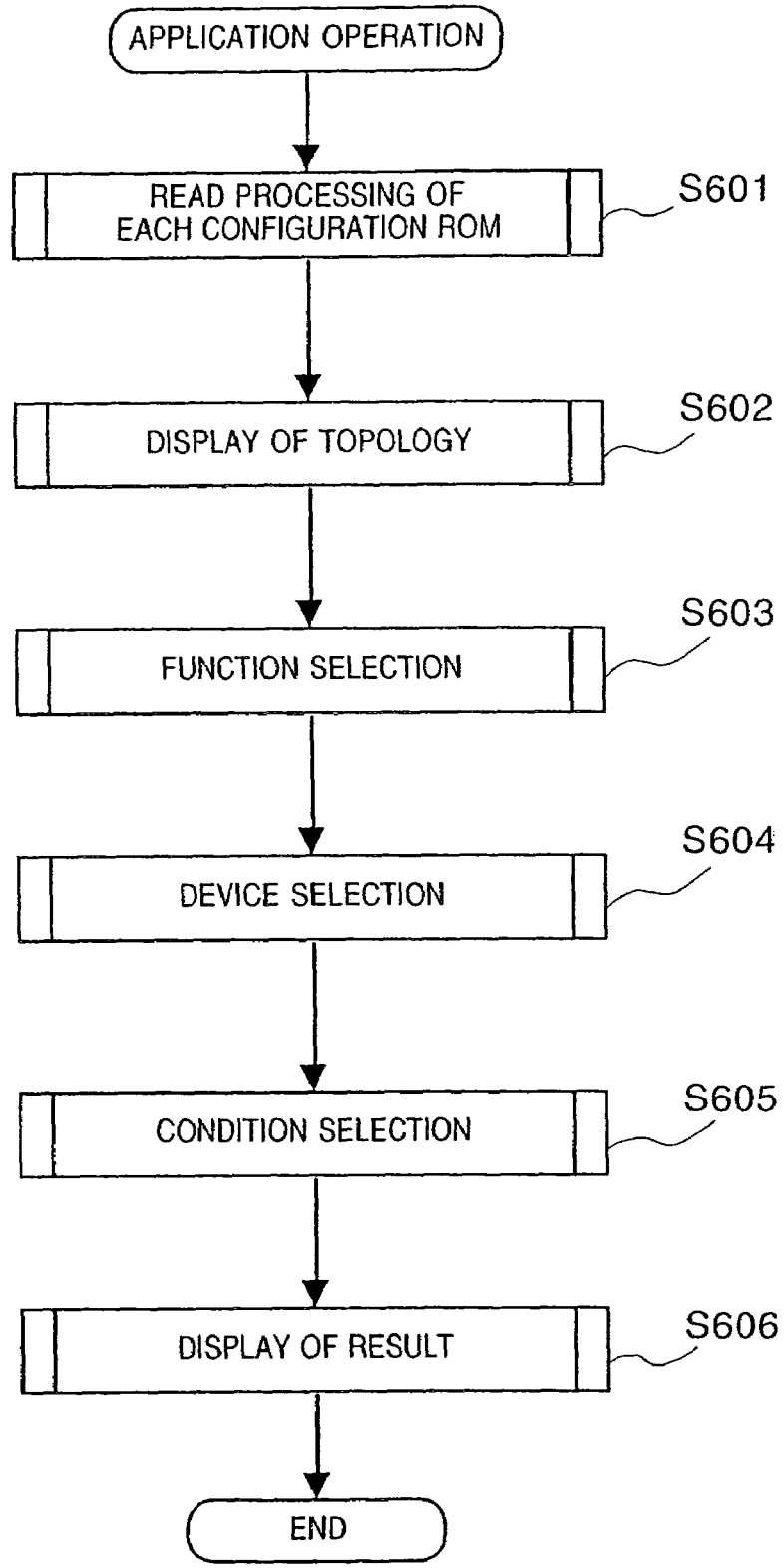
FIG. 39 is a flowchart illustrating detailed application operation according to the second embodiment.
Figure 40:
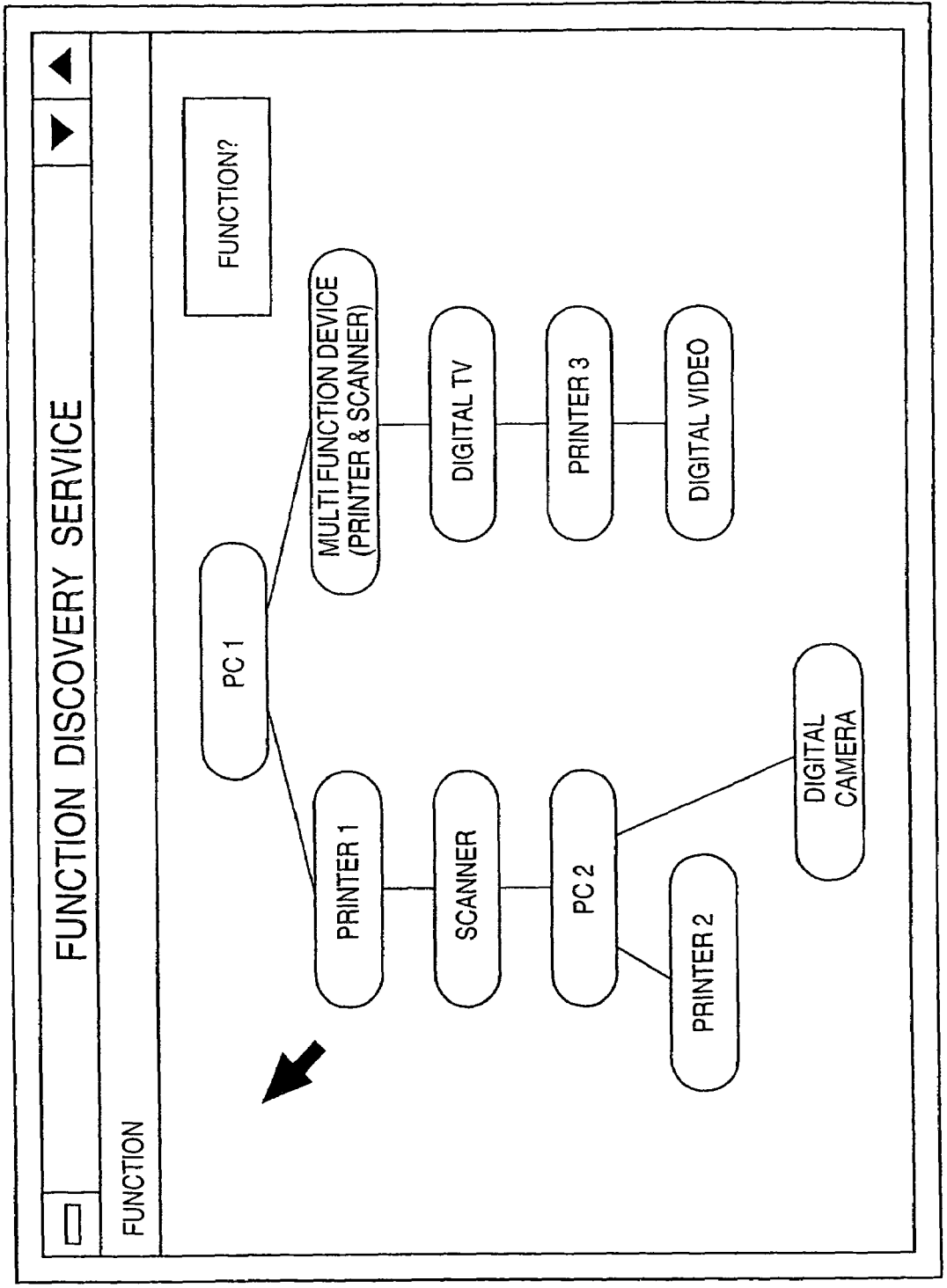
FIG. 40 is a view illustrating a display of the device map according to the second embodiment.

FIG. 39 is a flowchart illustrating the operation sequence of the application. When the application starts, it reads the configuration ROM of each device in the IEEE 1394 network in accordance with the sequence shown in FIG. 37, and creates function tables like the ones shown in FIGS. 38A and 38B (step S601). From the results (function tables), the application displays a network topology, as shown in FIG. 40. This network topology corresponds to the system shown in FIG. 36.

Note that FIGS. 40 to 44 illustrate various displays using a graphical user interface, but the form of the user interface is not limited to them. The user interface can take any form so long as it presents to the user the contents using function tables like the ones shown in FIGS. 38A and 38B.

Figure 41:
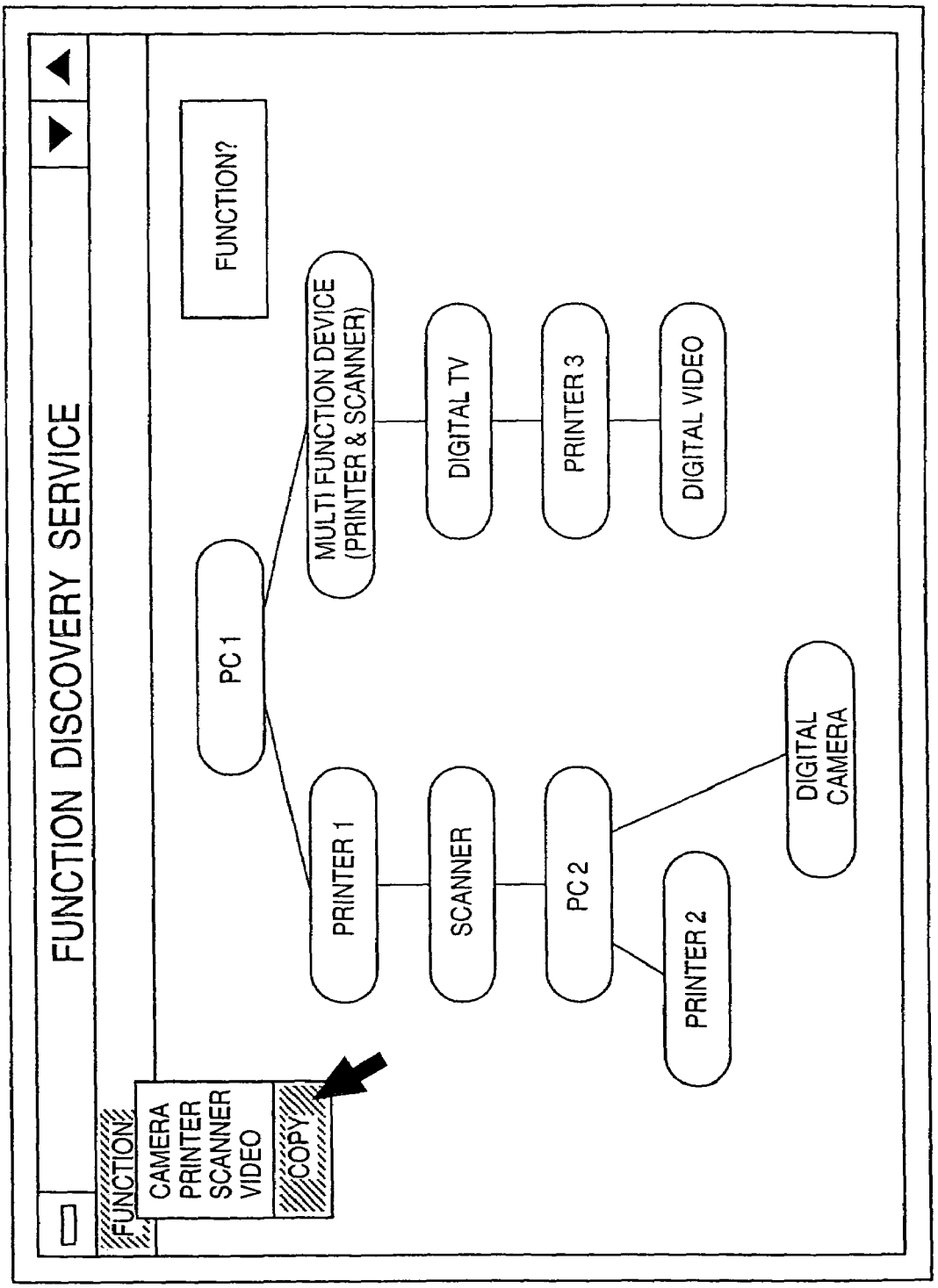
FIG. 41 is a view illustrating a state in which a function (copy) is selected on the display of the device map according to the second embodiment.

As for function selection (step S602), if the "Function" menu on the application window is selected, as shown in FIG. 41, functions that can be realized by the respective devices of the current IEEE 1394 network are displayed on a pull-down menu. This pull-down menu displays functions realized by a plurality of devices in addition to functions each realized by a single device. For example, a copying function is realized by the scanner and printer, and thus the pull-down menu displays "Copy", as shown in FIG. 41.

Assume that "Copy" is selected on the pull-down menu in FIG. 41. By selecting "Copy" from the pull-down menu, a device which performs a copy function is determined and the display changes to the one shown in FIG. 42. As auxiliary parameters for selecting a combination, "Speed" and "Quality" are added to the menu.

Figure 42:
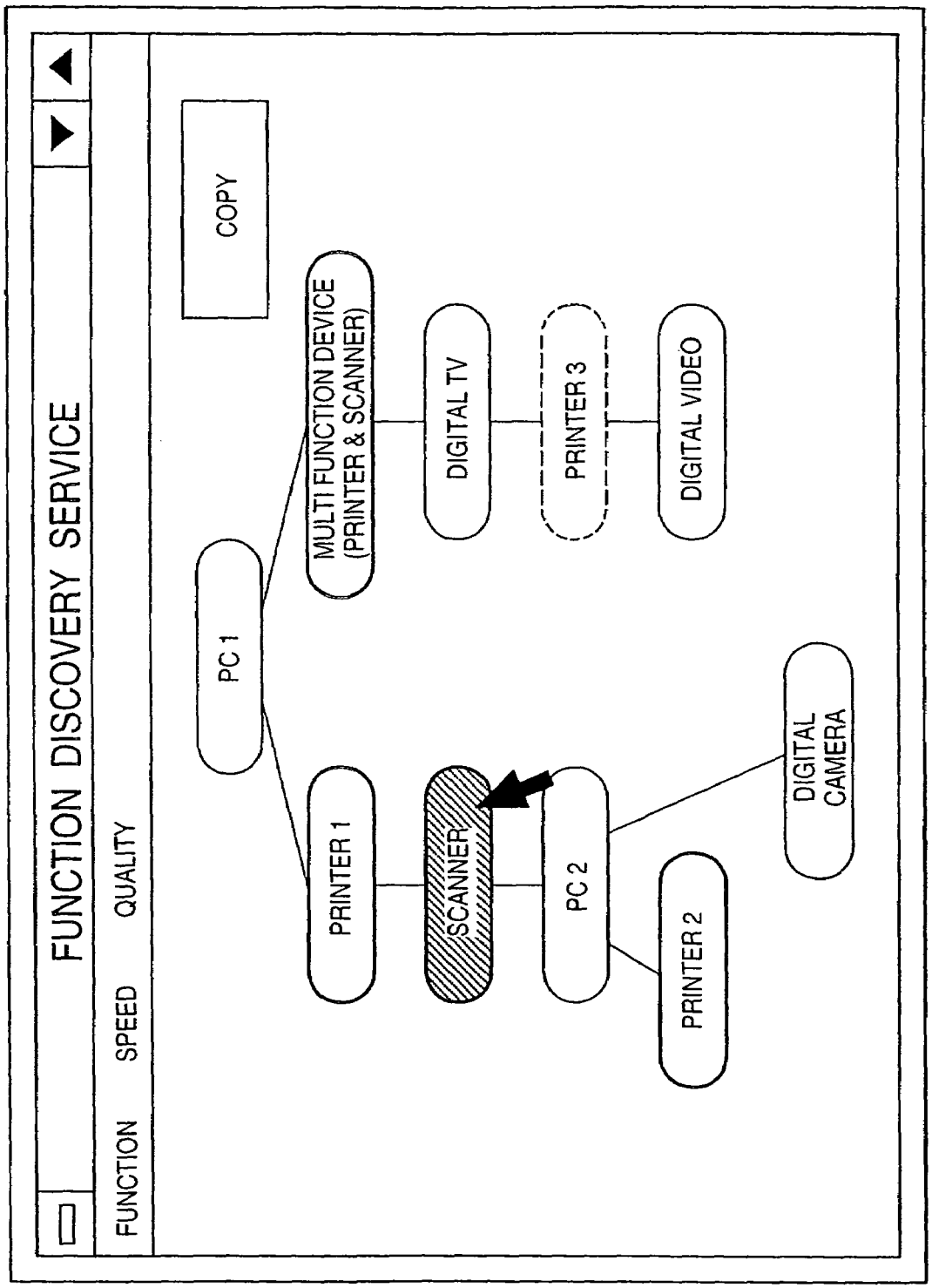
FIG. 42 is a view illustrating a state in which the scanner is selected on the display of the device map according to the second embodiment.

If the scanner is selected as a device for inputting an image (step S604), as shown in FIG. 42, devices capable of visibly outputting image information obtained by the scanner onto a medium are displayed with emphasis. Note that, although a device for inputting is selected first, an image outputting device may be selected first.

In this case, "Printer3" in FIG. 42 is not displayed with emphasis. This is because it is found from the tables of FIGS. 38A and 38B that no module for processing an image to be output to the printer exists in a combination of "Scanner" and "Printer3". In FIG. 42, a combination of devices (SCANNER and PRINTER) that can realize the function (COPY) is shown with a bold line. A target device (PRINTER) that cannot realize the function is shown with a broken line in order to discriminate the target device from other devices.

Figure 43:
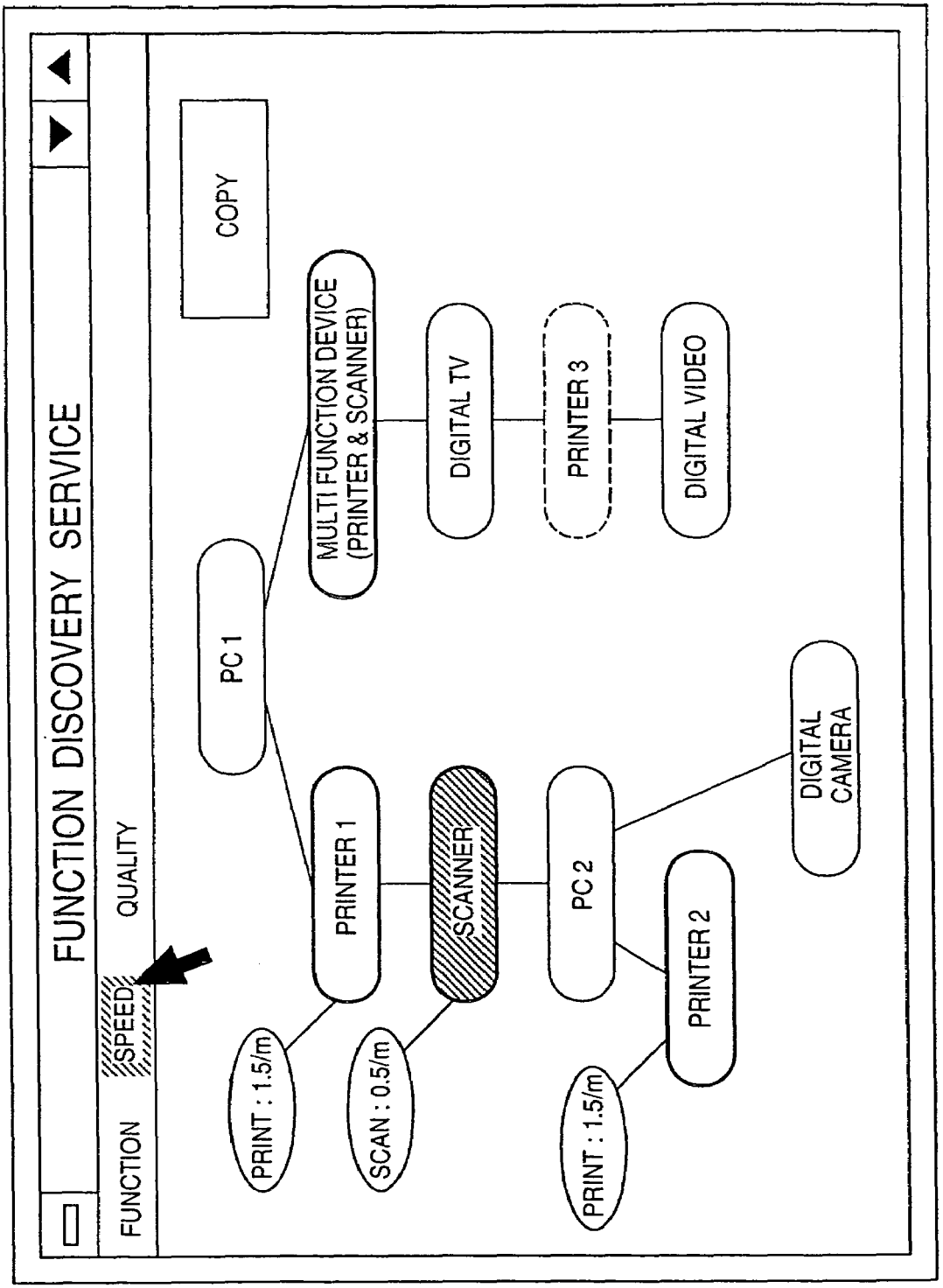
FIG. 43 is a view illustrating a state in which the speed is selected on the display of the device map according to the second embodiment.

Since a combination of devices for realizing the function "Copy" using a plurality of devices is found, condition setting (step S605) for selecting a combination becomes possible, as shown in FIGS. 43 and 44.

If speed-priority output is desired, "Speed" is selected from the menu of the application window, as shown in FIG. 43. Then, the application selects a combination supposed to have the highest output speed from combination candidates on the basis of data in tables 1 and 2, and displays the selected combination with emphasis. In this example, it is supposed that the highest speed can be attained by outputting data to two devices "Printer1" and "Printer2" each having an output speed of 1.5 sheets/min. Thus, "Printer1" and "Printer2" are displayed with emphasis, as shown in FIG. 43. Both "Printer1" and "Printer2" have an output function of 720 dpi.

If quality-priority output is desired, "Quality" is selected from the menu of the application window, as shown in FIG. 44. Then, the application selects a combination supposed to have the highest output quality from combination candidates on the basis of the function tables shown in FIGS. 38A and 38B, and displays the selected combination with emphasis. In this example, the printer of "Multi function device" has the highest resolution of 1,200 dpi. Thus, it is supposed that the highest quality can be attained by outputting data to this device. As shown in FIG. 44, "Multi function device" is displayed with emphasis.

As described above, when the display application program of the second embodiment is activated, it reads the configuration ROM of each device in the IEEE 1394 network, creates function tables like the ones in FIGS. 38A and 38B, and displays a topology display, as shown in FIG. 39.

As information supplied to the application, various pieces of function information in the configuration ROM are used. The second embodiment can therefore provide an information acquisition means by a lower-level part in comparison with communication protocol stacks such as the configuration ROM and the transaction for reading the configuration ROM (read transaction for the IEEE 1394 network). An application for providing information about functions realized by a plurality of devices can be installed without using any special database or database access means defined by an upper protocol.

According to the second embodiment, device function information is written as device unique information in a predetermined read-only memory in each device. Another device in the system, such as a management/display device for displaying device connection information, can read the information to recognize the function of the device. By preparing an appropriate application, it can estimate and find a new function realized by combining the functions of devices.

The function information of each device is searched using a predetermined read-only memory in the device. Especially an IEEE 1394-compliant device can acquire information by only low-level read transaction regardless of the upper protocol. For this reason, installation of software concerning communication and a database can be greatly reduced. This effectively reduces the ROM/RAM size in a device having a small system resource.

As has been described above, according to the present invention, the user can easily specify a device that satisfies a desired function in an environment where a plurality of devices are connected.

In addition, the present invention can present, to the user, function information realized by a plurality of devices in an environment where a plurality of devices are connected. This promotes effective use of the system.

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A processing device for a network, said processing device comprising:
a communication controller configured to receive a read command from network devices, the read command specifying a memory address in said processing device where data to be read out are stored; and
a memory having a memory area for storing optional device information listing optional devices mountable on said processing device irrespective of whether the optional devices have ever been mounted on said processing device, the optional device information including information about an optional device that is mountable on said processing device but is not mounted on said processing device, from which said information about the optional device can be read out by a network device using the read command,
wherein the optional device, that is mountable on said processing device but is not mounted on said processing device, includes an attachable part through which that optional device is attached to said processing device, and a function assist part for assisting a function of said processing device.

2. The processing device according to claim 1, further comprising a transmitter configured to transmit information in the memory area in accordance with the read command from the network device.

3. The processing device according to claim 1, wherein said communication controller comprises a communication control bus complying with an IEEE-1394 standard.

4. The processing device according to claim 3, wherein the memory area is set in a configuration ROM defined by the IEEE-1394 standard.

5. The processing device according to claim 4, wherein position information unique to an electronic device is written in a node dependent information directory of the configuration ROM.

6. The processing device according to claim 4, wherein the memory area is specified based upon information held in an Instance Directory of the configuration ROM.

7. The processing device according to claim 1, wherein said memory stores, in the memory area, information indicative of an optional device that is mountable on said processing device but is not mounted on said processing device and an optional device that is mountable on said processing device and has already been mounted on said processing device.

8. A processing device for a network, said processing device comprising:
a communication controller configured to send a read command to an external network device, the read command specifying a memory area of a memory in a network device where optional device information listing optional devices mountable on said processing device irrespective of whether the optional devices have ever been mounted on said network device is stored, wherein the optional device information includes information about an optional device that is mountable on said network device but is not mounted on said network device;
an acquisition unit configured to acquire the information about the optional device that is mountable on the network device but is not mounted on said network device, from the memory area of the network device, by using the read command; and
a display control unit configured to control a display based upon the information acquired by said acquisition unit,
wherein the optional device that is mountable on the network device but is not mounted on said network device, includes an attachable part through which that optional device is attached to the network device, and a function assist part for assisting a function of the network device.

9. The processing device according to claim 8, wherein said communication control unit comprises a communication control bus complying with an IEEE-1394 standard.

10. The processing device according to claim 9, wherein said acquisition unit accesses an Instance Directory stored in a configuration ROM defined by the IEEE-1394 standard to acquire information about the optional device which that is mountable on the network device.

11. The processing device according to claim 8, wherein
said acquisition unit acquires information indicative of the optional device that is mountable on the network device but is not mounted on the external device and a device that is mountable on the network device and has already been mounted on the network device, and
said display control means identifiably displays the optional device that is mountable on the network device but is not mounted on the network device and the optional device that is mounted on the network device and has already been mounted on the network device based on the information acquired by said acquisition unit.

12. A method of controlling a processing device for a network, said method comprising:
a storage step, of storing optional device information listing optional devices mountable on the processing device irrespective of whether the optional devices have ever been mounted on the processing device, said optional device information including information about an optional device, that is mountable on the processing device but is not mounted on the processing device, in a memory area that is accessible by a network device by using a read command that specifies a memory address where the information about an optional device to be read out is stored;
a communication control step, of receiving a read command from the network device; and
a transmission step, of transmitting the information about the optional device, that is mountable on the processing, device but is not mounted on the processing device, held in the memory area, in accordance with the read command from the network device,
wherein the optional device, that is mountable on the processing device but is not mounted on the processing device, includes an attachable part through which the optional device is attached to the processing device, and a function assist Dart for assisting a function of the processing device.

13. A method of controlling a processing device for a network, said method comprising:
a communication control step, of sending a read command to a network device, the read command specifying a memory area of a memory in the network device where optional device information listing optional devices mountable on said processing device irrespective of whether the optional devices have ever been mounted on said network device is stored, wherein the optional device information includes information about an optional device that is mountable on said network device but is not mounted on said network device;
an acquisition step, of acquiring the information about an optional device that is mountable on the network device but is not mounted on the network device, from the memory area by using the read command; and
a display control step, of controlling a display based upon the information acquired in said acquisition step,
wherein the optional device that is mountable on the network device but is not mounted on the network device, includes an attachable part through which the optional device is attached to the network device, and a function assist part for assisting a function of the network device.

14. A storage medium storing a control program for implementing a method of controlling processing device, the method comprising:
a storage step, of storing optional device information listing optional devices mountable on the processing device irrespective of whether the optional devices have ever been mounted on the processing device, the optional device information including information about an optional device that is mountable on the processing device but is not mounted on the processing device, in a memory area that is accessible by an external device by using a read command that specifies a memory address where data to be read out is stored;
a communication control step, of receiving a read command from the external device; and
a transmission steps of transmitting the information about the optional device that is mountable on the processing device but is not mounted on the processing device, held in the memory area, in accordance with the read command from the external device,
wherein the optional device mountable on the processing device includes an attachable part through which the optional device is attached to the processing device, and a function assist part for assisting a function of the processing device.

15. A storage medium storing a control program for implementing a method of controlling a processing device, said method comprising:
a communication control step, of sending a read command to an external device, the read command specifying a memory address where data to be read out are stored;
an acquisition step, of acquiring information about an optional device that is mountable on the external device but is not mounted on the external device from a memory area of the external device listing optional devices mountable on the external device irrespective of whether the optional devices have ever been mounted on the external device, by using the read command; and
a display control step, of controlling a display based upon the information acquired in said acquisition step,
wherein the optional device that is mountable on the external device but is not mounted on the external device, includes an attachable part through which the optional device is attached to the external device, and a function assist part for assisting a function of the external device.

16. A processing device for a network, said processing device comprising:
a memory configured to store optional device information listing optional devices mountable on said processing device irrespective of whether the optional devices have ever been mounted on said processing device, wherein the optional device information includes information about an optional device that is mountable on said processing device but is not mounted on said processing device; and
a communication unit configured to send the stored information to a network device,
wherein the optional device, that is mountable on said processing device but is not mounted on said processing device, includes an attachable part through which that optional device is attached to said processing device, and a function assist part for assisting a function of said processing device.

17. The processing device according to claim 16, wherein the optional device mountable on said processing device includes an attachable part through which the optional device is attached to said processing device and a function assist part for assisting a function of said processing device.

18. The processing device according to claim 16, wherein the memory stores information about an optional device which is mountable on said processing device and has already been mounted on said processing device.

19. A processing method of controlling a processing apparatus for communicating with a network device, said method comprising:

an accessing step of accessing a network device having a memory which stores optional device information listing optional devices mountable on said network device irrespective of whether the optional devices have ever been mounted on said network device, wherein the optional device information includes information about an optional device that is mountable on said network device but is not mounted on said network device;

an acquisition step of acquiring, from the network device, information about an optional device that is mountable on the network device but is not mounted on the network device by access in said accessing step; and a display control step of controlling a display based upon the information acquired in said acquisition step, wherein the optional device, that is mountable on the network device but is not mounted on the network device, includes an attachable part through which the optional device is attached to the network device, and a function assist part for assisting a function of the network device.

20. The method according to claim 19, wherein the optional device mountable on the network device includes an attachable part through which the optional device is attached to the network device, and a function assist part for assisting a function of the network device.

21. The method according to claim 19, wherein said acquisition step includes acquiring information indicative of the optional device that is mountable on the network device but is not mounted on the network device and an optional device that is mountable on the network device and has already been mounted on the network device, and said display control step identifiably displays the device that is mountable on the network device but is not mounted on the network device and the optional device that is mountable on the network device and has already been mounted on the network device based on the information acquired in said acquisition step.

* * * * *

UNITED STATES PATENT AND TRADEMARK OFFICE
CERTIFICATE OF CORRECTION

PATENT NO. : 7,203,787 B2
APPLICATION NO. : 11/232996
DATED : April 10, 2007
INVENTOR(S) : Atsushi Nakamura et al.

It is certified that error appears in the above-identified patent and that said Letters Patent is hereby corrected as shown below:

COLUMN 6:
Line 10, "maximum-of" should read --maximum of--.

COLUMN 8:
Line 32, "ends.," should read --ends,--.

COLUMN 12:
Line 56, "subtraction" should read --subaction--.
Line 59, "predetermined-gap" should read --predetermined gap--.

COLUMN 13:
Line 37, "updated" should read --update--.
Line 38, "at a" should read --data--.
Line 57, "divided-into" should read --divided into--.

COLUMN 15:
Line 29, "Band" should read --B and--.
Line 30, "perform-real-time" should read --perform real-time--.

COLUMN 18:
Line 50, "29," should read a--29.--.

COLUMN 27:
Line 1, "which" should be deleted.
Line 34, "ing, device" should read --ing device--.
Line 41, "Dart" should read --part--.

COLUMN 28:
Line 2, "processing" should read --a processing--.
Line 16, "steps" should read --step,--.

UNITED STATES PATENT AND TRADEMARK OFFICE
CERTIFICATE OF CORRECTION

PATENT NO.         : 7,203,787 B2
APPLICATION NO.    : 11/232996
DATED              : April 10, 2007
INVENTOR(S)        : Atsushi Nakamura et al.

It is certified that error appears in the above-identified patent and that said Letters Patent is hereby corrected as shown below:

COLUMN 29:
Line 29, "for" should be deleted.
Line 37, "or" should read --or is--.

Signed and Sealed this

Twentieth Day of May, 2008

JON W. DUDAS
*Director of the United States Patent and Trademark Office*